US010283807B2

(12) United States Patent
Busacca et al.

(10) Patent No.: US 10,283,807 B2
(45) Date of Patent: May 7, 2019

(54) LONGITUDINAL CONSTRAINTS FOR ENERGY STORAGE DEVICES

(71) Applicant: Enovix Corporation, Fremont, CA (US)

(72) Inventors: Robert S. Busacca, San Francisco, CA (US); Ashok Lahiri, Cupertino, CA (US); Murali Ramasubramanian, Fremont, CA (US); Bruno A. Valdes, Sunnyvales, CA (US); Gardner Cameron Dales, Los Gatos, CA (US); Christopher J. Spindt, Menlo Park, CA (US); Geoffrey Matthew Ho, San Ramon, CA (US); Harrold J. Rust, III, Alamo, CA (US); James D. Wilcox, Pleasanton, CA (US); John F. Varni, Los Gatos, CA (US); Kim Han Lee, Pleasanton, CA (US); Nirav S. Shah, Pleasanton, CA (US); Richard J. Contreras, Campbell, CA (US); Lynn Van Erden, Pollock Pines, CA (US); Ken S. Matsubayashi, Fremont, CA (US); Jeremie J. Dalton, San Jose, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 15/572,722

(22) PCT Filed: May 13, 2016

(86) PCT No.: PCT/US2016/032284
§ 371 (c)(1),
(2) Date: Nov. 8, 2017

(87) PCT Pub. No.: WO2016/183410
PCT Pub. Date: Nov. 17, 2016

(65) Prior Publication Data
US 2018/0145367 A1 May 24, 2018

Related U.S. Application Data

(60) Provisional application No. 62/161,621, filed on May 14, 2015.

(51) Int. Cl.
*H01M 10/04* (2006.01)
*H01M 2/02* (2006.01)
(Continued)

(52) U.S. Cl.
CPC ....... *H01M 10/0468* (2013.01); *H01M 2/021* (2013.01); *H01M 2/1653* (2013.01); *H01M 10/0525* (2013.01); *H01M 2004/021* (2013.01)

(58) Field of Classification Search
CPC .................................................. H01M 10/0468
See application file for complete search history.

(56) References Cited

U.S. PATENT DOCUMENTS

| 5,238,759 A | 8/1993 | Plichta et al. |
| 5,294,504 A | 3/1994 | Otagawa |

(Continued)

FOREIGN PATENT DOCUMENTS

| CA | 02388711 | 5/2001 |
| CN | 1286811 | 9/1993 |

(Continued)

OTHER PUBLICATIONS

Patent Cooperation Treaty, International Search Report for PCT/US2016/032355, dated Aug. 25, 2017, 4 pages 2017.
(Continued)

*Primary Examiner* — Sarah A. Slifka
*Assistant Examiner* — Brian R Ohara
(74) *Attorney, Agent, or Firm* — Bryan Cave Leighton Paisner LLP

(57) ABSTRACT

A energy storage device for cycling between a charged state and a discharged state, the energy storage device including an enclosure, an electrode assembly and a non-aqueous liquid electrolyte within the enclosure, and a constraint that maintains a pressure on the electrode assembly as the energy storage device is cycled between the charged and the discharged states.

38 Claims, 18 Drawing Sheets

(51) Int. Cl.
  *H01M 2/16* (2006.01)
  *H01M 10/0525* (2010.01)
  *H01M 4/02* (2006.01)

(56) References Cited

U.S. PATENT DOCUMENTS

| | | | |
|---|---|---|---|
| 5,709,962 A | 1/1998 | Bailey | |
| 6,090,505 A | 7/2000 | Shimamura et al. | |
| 6,235,427 B1 | 5/2001 | Idota et al. | |
| 6,287,371 B1 | 9/2001 | Ota et al. | |
| 6,383,234 B1* | 5/2002 | Noh | H01M 10/0413 29/623.1 |
| 6,432,579 B1 | 8/2002 | Tsuji et al. | |
| 6,432,585 B1 | 8/2002 | Kawakami | |
| 6,525,391 B1 | 2/2003 | Bertrand et al. | |
| 6,679,925 B1 | 1/2004 | Tanizaki et al. | |
| 6,791,737 B2 | 9/2004 | Giron | |
| 7,066,971 B1 | 6/2006 | Carlson | |
| 7,309,548 B2 | 12/2007 | Ota et al. | |
| 7,402,829 B2 | 7/2008 | Green | |
| 8,101,298 B2 | 1/2012 | Green et al. | |
| 8,192,788 B1 | 6/2012 | Shah et al. | |
| 8,475,957 B2 | 7/2013 | Rust, III et al. | |
| 8,527,395 B2 | 9/2013 | Ramasubramanian et al. | |
| 8,580,439 B1* | 11/2013 | Kaiser | H01M 10/0468 429/208 |
| 8,841,030 B2 | 9/2014 | Lahiri et al. | |
| 9,356,271 B2 | 5/2016 | Ramasubramanian et al. | |
| 9,362,553 B2 | 6/2016 | Lahiri et al. | |
| 9,660,292 B2 | 5/2017 | Rust, III et al. | |
| 9,806,331 B2 | 10/2017 | Lahiri et al. | |
| 9,991,490 B2 | 6/2018 | Ramasubramanian et al. | |
| 10,020,514 B2 | 7/2018 | Ramasubramanian et al. | |
| 10,038,214 B2 | 7/2018 | Rust, III | |
| 2002/0013986 A1 | 2/2002 | Ahn et al. | |
| 2003/0082446 A1 | 5/2003 | Chiang et al. | |
| 2004/0185336 A1 | 9/2004 | Ito et al. | |
| 2004/0214085 A1 | 10/2004 | Sheem et al. | |
| 2004/0234861 A1 | 11/2004 | Kawase et al. | |
| 2004/0241540 A1 | 12/2004 | Tsutsumi et al. | |
| 2005/0008939 A1 | 1/2005 | Ota et al. | |
| 2005/0095503 A1 | 5/2005 | Adachi et al. | |
| 2005/0130383 A1 | 6/2005 | Divakaruni et al. | |
| 2005/0208379 A1 | 9/2005 | Musha et al. | |
| 2006/0093871 A1 | 5/2006 | Howard | |
| 2007/0002523 A1 | 1/2007 | Ando et al. | |
| 2007/0097481 A1 | 5/2007 | Burdis | |
| 2007/0172732 A1 | 7/2007 | Jung et al. | |
| 2007/0285051 A1* | 12/2007 | Jeon | H01M 10/0413 320/112 |
| 2008/0003490 A1 | 1/2008 | Christensen | |
| 2008/0081256 A1 | 4/2008 | Madou et al. | |
| 2008/0081257 A1 | 4/2008 | Yoshida et al. | |
| 2008/0233455 A1 | 9/2008 | Deimede | |
| 2009/0035664 A1 | 2/2009 | Chiang et al. | |
| 2009/0068567 A1 | 3/2009 | Konishiike et al. | |
| 2009/0123847 A1 | 5/2009 | Okada et al. | |
| 2009/0142656 A1 | 6/2009 | Nathan et al. | |
| 2009/0263716 A1 | 10/2009 | Ramasubramanian et al. | |
| 2009/0303660 A1 | 12/2009 | Nair et al. | |
| 2010/0040951 A1 | 2/2010 | Yamamoto et al. | |
| 2010/0051856 A1 | 3/2010 | Kim et al. | |
| 2010/0209775 A1 | 8/2010 | Kim | |
| 2010/0266907 A1 | 10/2010 | Yazami | |
| 2010/0285368 A1 | 11/2010 | Yamamato et al. | |
| 2011/0008656 A1 | 1/2011 | Takayuki et al. | |
| 2011/0014522 A1 | 1/2011 | Visco et al. | |
| 2011/0020701 A1 | 1/2011 | Park et al. | |
| 2011/0020713 A1 | 1/2011 | Cui et al. | |
| 2011/0020719 A1 | 1/2011 | Manabe et al. | |
| 2011/0067228 A1 | 3/2011 | Green | |
| 2011/0111283 A1 | 5/2011 | Rust, III et al. | |
| 2011/0129732 A1 | 6/2011 | Bachrach et al. | |
| 2011/0171518 A1 | 7/2011 | Dunn et al. | |
| 2011/0200862 A1 | 8/2011 | Kurosawa | |
| 2012/0100438 A1 | 4/2012 | Fasching et al. | |
| 2012/0176093 A1 | 7/2012 | Ramasubramanian et al. | |
| 2012/0202113 A1 | 8/2012 | Hodge et al. | |
| 2012/0288742 A1* | 11/2012 | Tanaka | H01M 4/133 429/144 |
| 2013/0078493 A1* | 3/2013 | Chen | H01M 2/0207 429/96 |
| 2013/0143120 A1 | 6/2013 | Ramasubramanian et al. | |
| 2013/0189602 A1 | 7/2013 | Lahiri et al. | |
| 2013/0230751 A1 | 9/2013 | Shaw | |
| 2014/0050969 A1* | 2/2014 | Rust, III | H01M 10/0525 429/160 |
| 2014/0272547 A1 | 9/2014 | Ramasubramanian et al. | |
| 2014/0335395 A1 | 11/2014 | Ramasubramanian et al. | |
| 2015/0024253 A1 | 1/2015 | Noh | |
| 2015/0079452 A1 | 3/2015 | Park et al. | |
| 2015/0104686 A1 | 4/2015 | Brommer et al. | |
| 2018/0040876 A1 | 2/2018 | Lahiri et al. | |
| 2018/0145367 A1 | 5/2018 | Busacca et al. | |

FOREIGN PATENT DOCUMENTS

| | | |
|---|---|---|
| CN | 1555588 | 12/2004 |
| CN | 102007625 | 6/2011 |
| CN | 102569758 | 7/2012 |
| EP | 0883199 | 12/1998 |
| EP | 1028476 | 8/2000 |
| EP | 1100134 | 5/2001 |
| EP | 1102340 | 5/2001 |
| EP | 2048262 | 4/2009 |
| EP | 2277214 | 10/2009 |
| EP | 3295507 | 3/2018 |
| JP | H01132064 | 5/1989 |
| JP | H06236768 A | 8/1994 |
| JP | 2003323882 | 11/2003 |
| JP | 2006100280 | 4/2006 |
| JP | 2006173001 | 6/2006 |
| JP | 2006286427 | 10/2006 |
| JP | 2007258160 | 10/2007 |
| JP | 2008171732 | 7/2008 |
| JP | 2009170258 A | 7/2009 |
| JP | 2010146732 A | 7/2010 |
| JP | 2010225552 A | 10/2010 |
| JP | 2010262752 A | 11/2010 |
| JP | 2012516941 A | 7/2012 |
| JP | 2015064959 A | 4/2015 |
| KR | 20030044508 | 6/2003 |
| KR | 1020060050988 | 5/2006 |
| NL | 1015956 | 2/2002 |
| TW | 201225385 A | 6/2012 |
| WO | 0243168 A2 | 5/2002 |
| WO | 03105258 | 12/2003 |
| WO | 2008030215 | 3/2008 |
| WO | 2008089110 | 7/2008 |
| WO | 2009129490 | 10/2009 |
| WO | 2009140300 | 11/2009 |
| WO | 2010090956 A2 | 8/2010 |
| WO | 2010092059 | 8/2010 |
| WO | 2010138176 | 12/2010 |
| WO | 2011154862 | 12/2011 |

(56) References Cited

FOREIGN PATENT DOCUMENTS

| WO | 2013112670 | 8/2013 |
|---|---|---|
| WO | 2014028230 A1 | 2/2014 |

OTHER PUBLICATIONS

Patent Cooperation Treaty, International Search Report for PCT/US2016/032284, dated Aug. 26, 2016, 4 pages 2016.
Patent Cooperation Treaty, International Search Report issued on PCT/US2012/022393, dated Oct. 10, 2012, 4 pages.
Golodnitsky et al., Advanced materials for the 3D microbattery, Journal of Power Sources, 2006, 153, 281-287.
Long et al., Three-Dimensional battery Architectures, Chemical Reviews, 2004, 104, 4463-4492.
Broussely et al., Li-ion batteries and portable power source prospects for the next 5-10 years, Journal of Power Sources, 136, 2004, 386-394.
Whitehead et al., Current Collectors for positive electrodes of lithium-based batteries, Journal of the Electrochemical Society, 2005, A5105-A2113, 152(11) Sep. 8, 2005.
United Kingdom Search Report dated Dec. 18, 2012, 4 pages dated Dec. 18, 2012.
Patent Cooperation Treaty, International Search report issued for PCT/US2013/022868, dated May 15, 2013, 3 pages dated May 15, 2013.
Patent Cooperation Treaty, International Search Report for PCT/US2009/041012, dated Sep. 8, 2009, 4 pages dated Sep. 8, 2009.
Liu, C., Bulk Micromachining and Silicon Anisotropic Etching, Foundations of MEMS, Prentice Hall Inc. Chapter 10, pp. 326-370; Prentice Hall Dec. 31, 2006.
Shin et al. Porous Silicon Negative Electrodes for Rachargeable Lithium Batteries, Journal of Power Sources, 139 (2005) 314-320 Sep. 13, 2004.
Vyatkin et al., Random and Ordered Macropore in p-type silicon J. Electrochem. Soc. 149, 1, G70-G76 (2002) Dec. 6, 2001.
Arora, P. et al., "Battery Separators", Chem. Reviews, 2004, 104, 4419-4462 Mar. 30, 2004.
Bourderau et al., "Amorphous Silicon As A Possible Anode Material For Li-Ion Batteries," Journal of Power Sources, 1999, 81-82, 233-236 Sep. 30, 1999.
Li et al., "The Crystal Structural Evolution Of Nano-Si Anode Caused By Lithium Insertion And Extraction At Room Temperature," Solid State Ionics, 2000, 135, 181-191 Nov. 30, 2000.
Kasavajjula et al., Nano- and Bulk-Silicon-Based Insertion Anodes for Lithium-Ion Secondary Cells, Journal of Power Sources, 2007, 1003-1039, 163 Nov. 9, 2006.
Green et al., Structured silicon anodes for lithium battery applications, Electrochemical and Solid State Letters, 6, 2003, A75-A79 Mar. 5, 2003.
Patent Cooperation Treaty, International Search Report for PCT/US2013/053235, dated Jan. 28, 2014, 5 pages dated Jan. 28, 2014.
Patent Cooperation Treaty, International Search Report issued for PCT/US2014/025200, dated Jul. 29, 2014, 4 pages dated Jul. 29, 2014.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, dated Aug. 8, 2015, 9 pages.
Harraz et al., Immersion plating of nickel onto a porous silicon layer from fluoride solutions, Phys. Stat. Sol., 2003, 197(1): 51-56.
Harraz et al., Different behavior in immersion plating of nickel on porous silicon from acidic and and alkaline fluoride media, J. Elect. Soc., 2003, 150(5): C277-284.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theorectical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Su et al., Silicon-Based Nanomaterials for Lithium-Ion Batteries: A Review, Advanced Energy Materials, 2013, 1-23.
Maranchi et al., High capacity, reversible silicon thin-film anodes for lithium-ion batteries, Electronchemical and Solid-State Letters, 2001, 6(9), A198-A201.
Iaboni et al., Li15Sl4 Formation in silicon thin film negative electrodes, Journal of the Electrochemical Society, 2016, 163(2), A255-A261.
European Patent Office, Extended European Search Report for 13829954.0, EP 2885830, dated Feb. 19, 2016, 7 pages.
European Patent Office, Extended European Search Report for 14768734.7, EP 2973785, 10 pages dated Jul. 15, 2016.
Roberts et al., 3D lithium ion batteries-from fundamentals to fabrication, Journal of Materials Chemistry, Royal Society of Chemistry, 2011, 21: 9876-9890 2011.
Taiwan Search Report for App. No. 102129550, dated Sep. 9, 2016, 1 page dated Sep. 9, 2016.
Patent Cooperation Treaty, International Search Report for PCT/US2017/032355, 4 pages dated Aug. 25, 2017.
European Patent Office, Extended European Search Report for Application No. 16793590.7, publication EP 3295507, 7 pages.

* cited by examiner

LONGITUDINAL CONSTRAINTS FOR ENERGY STORAGE DEVICES

The present disclosure generally relates to structures for use in energy storage devices, to energy storage devices incorporating such structures, and to methods for producing such structures and energy devices.

Rocking chair or insertion secondary batteries are a type of energy storage device in which carrier ions, such as lithium, sodium, potassium, calcium, magnesium or aluminum ions, move between a positive electrode and a negative electrode through an electrolyte. The secondary battery may comprise a single battery cell, or two more battery cells that have been electrically coupled to form the battery, with each battery cell comprising a positive electrode, a negative electrode, a microporous separator and an electrolyte.

In rocking chair battery cells, both the positive and negative electrode structures comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

FIG. 1 shows a cross sectional view of an electrochemical stack of an existing energy storage device, such as a non-aqueous, secondary battery. The electrochemical stack 1 includes, in a stacked arrangement, positive electrode current collector 3, positive electrode active material layer 5, microporous separator 7, negative electrode active material layer 9, and negative electrode current collector 11. Each of the layers has a height, measured in the electrode stacking direction (i.e., in the direction from positive electrode current collector 3 to negative electrode current collector 11 as illustrated in FIG. 1) that is significantly less (e.g., a factor of at least ten less) than the length and the width of each of the layers, respectively, measured in directions that are mutually perpendicular and perpendicular to the electrode stacking direction. Referring now to FIG. 2, a roll 13 (sometimes referred to as a "jelly roll") having top 15 and bottom 17 is formed by winding the electrochemical stack about a central axis 19; roll 13 is then stuffed into a can (not shown) and filled with a non-aqueous electrolyte to assemble a secondary battery. As illustrated in FIG. 2, the electrode stacking direction of the layers is orthogonal to central axis 19.

Existing energy storage devices, such as batteries, fuel cells, and electrochemical capacitors, typically have two-dimensional laminar architectures (e.g., planar or spiral-wound laminates) as illustrated in FIGS. 1 and 2 with a surface area of each laminate being roughly equal to its geometrical footprint (ignoring porosity and surface roughness). Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area. See, e.g., Rust et al., WO2008/089110 and Long et. al, "Three-Dimensional Battery Architectures," *Chemical Reviews*, (2004), 104, 4463-4492.

Conventional wound batteries (see, e.g., U.S. Pat. Nos. 6,090,505 and 6,235,427 and FIG. 2) typically have electrode materials (active materials, binder, conductivity aid) coated onto a single foil and compressed prior to cell assembly. The foil onto which the electrode is coated onto is typically part of the current collection path. In single jellyroll batteries such as the 18650 or prismatic cells, the current collector foil is ultrasonically welded to electrode buses, tabs, tags etc., that carry the current from the active materials, through the current collector foils and the tabs, to the outside of the battery. Depending on the design, there may be tabs in multiple places along a single jellyroll, or along one place in one or both ends of the current collector foil. Conventional stacked battery pouch cells have multiple plates (or foils) of active material with areas on top of each foil that are subsequently gathered and welded together to a tab; which then carries the current to the outside of the battery pouch (see, e.g., U.S. Patent Publication No. 2005/0008939).

One of the challenges associated with secondary batteries, however, is reliability and cycle life of the battery. The electrode structures of a lithium ion battery, for example, tend to expand (swell) and contract as the battery is repeatedly charged and discharged which, in turn, can lead to an electrical short circuit and failure of the device.

Among the various aspects of the present disclosure is the provision of three-dimensional structures for use in energy storage devices such as batteries, fuel cells, and electrochemical capacitors. Advantageously, and in accordance with one aspect of the present disclosure, the proportion of electrode active material relative to the other components of the energy storage device, i.e., the non-active material components of the energy storage device may be increased. As a result, energy storage devices comprising three-dimensional structures of the present disclosure may have increased energy density. They may also provide a higher rate of energy retrieval than two-dimensional energy storage devices for a specific amount of energy stored, such as by minimizing or reducing transport distances for electron and ion transfer between a positive electrode and negative electrode. These devices may be more suitable for miniaturization and for applications where a geometrical area available for a device is limited and/or where energy density requirement is higher than what may be achieved with a laminar device.

Briefly, therefore, according to one aspect of the present disclosure, an energy storage device is provided for cycling between a charged state and a discharged state. The energy storage device includes an enclosure, an electrode assembly and a non-aqueous liquid electrolyte within the enclosure, and a constraint that maintains a pressure on the electrode assembly as the energy storage device is cycled between the charged and the discharged states. The electrode assembly has a population of electrode structures, a population of counter-electrode structures and an electrically insulating microporous separator material between members of the electrode and counter-electrode populations. The electrode assembly has opposing first and second longitudinal end surfaces separated along a longitudinal axis, and a lateral surface surrounding the longitudinal axis and connecting the first and second longitudinal end surfaces, a combined surface area of the first and second longitudinal end surfaces being less than 33% of a combined surface area of the lateral surface and the first and second longitudinal end surfaces. Members of the electrode population and members of the counter-electrode population are arranged in an alternating sequence in a stacking direction that parallels the longitudinal axis within the electrode assembly. The constraint has first and second compression members connected by at least one tension member that pulls the compression members toward each other, and the constraint maintains a pressure on the electrode assembly in the stacking direction that exceeds the pressure maintained on the electrode assembly in each of two directions that are mutually perpendicular and perpendicular to the stacking direction.

According to yet another aspect of the disclosure, a secondary battery is provided for cycling between a charged state and a discharged state, the secondary battery having a battery enclosure, an electrode assembly and a non-aqueous liquid electrolyte within the battery enclosure, and a constraint that maintains a pressure on the electrode assembly as the secondary battery is cycled between the charged and the discharged states. The electrode assembly has a population of electrode structures, a population of counter-electrode structures and an electrically insulating microporous separator material between members of the electrode and counter-electrode populations. The electrode assembly has opposing first and second longitudinal end surfaces separated along a longitudinal axis, and a lateral surface surrounding the longitudinal axis and connecting the first and second longitudinal end surfaces, the surface area of the first and second longitudinal end surfaces being less than 33% of the surface area of the electrode assembly. Members of the electrode population and members of the counter-electrode population are arranged in an alternating sequence in a stacking direction that parallels the longitudinal axis within the electrode assembly. A projection of the members of the electrode population and the counter-electrode populations onto the first longitudinal surface circumscribes a first projected area and a projection of the members of the electrode population and the counter-electrode populations onto the second longitudinal surface circumscribes a second projected area. The constraint has first and second compression members that overlie the first and second projected areas, respectively, the compression members being connected by tension members that overlie the lateral surface of the electrode assembly and pull the compression members toward each other, and the constraint maintains a pressure on the electrode assembly in the stacking direction that exceeds the pressure maintained on the electrode assembly in each of two directions that are mutually perpendicular and perpendicular to the stacking direction Other objects and features will be in part apparent and in part pointed out hereinafter.

BRIEF DESCRIPTION OF THE DRAWINGS

Corresponding reference characters indicate corresponding parts throughout the drawings.

Definitions

Figure 1:
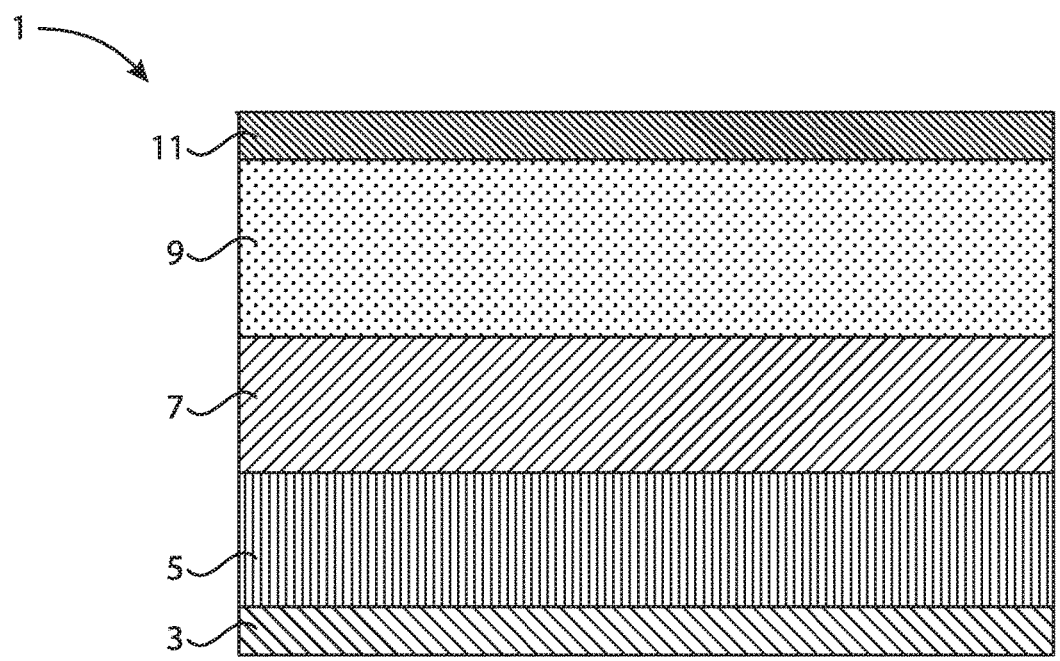
FIG. 1 is a cross-section of a cell of an electrochemical stack of a prior art, two-dimensional energy storage device, such as a lithium ion battery.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about," Accordingly, unless indicated to the contrary, the numerical parameters set forth in the following specification and attached claims are approximations. Each numerical parameter should at least be construed in light of the number of reported significant digits and by applying ordinary rounding techniques.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include charging the battery from a discharged state to a charged state, and then discharging back to the discharged state, to complete the cycle. The single cycle can also include discharging the battery from the charged state to the discharged state, and then charging back to a charged state, to complete the cycle.

"Feret diameter" as referred to herein with respect to the electrode assembly is defined as the distance between two parallel planes restricting the electrode assembly measured in a direction perpendicular to the two planes.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver current over a period of time, as measured under standard temperature conditions (25° C.). For example, the rated capacity may be measured in units of Amp·hour, either by determining a current output for a specified time, or by determining for a specified current the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours.

DETAILED DESCRIPTION

In general, a secondary battery of the present disclosure comprises a battery enclosure, an electrode assembly and a non-aqueous liquid electrolyte within the battery enclosure, and a constraint that maintains a pressure on the electrode assembly as the secondary battery is cycled between the charged and the discharged states. As previously noted, during formation of a secondary battery and/or subsequent cycling of the secondary battery between a charged state and a discharged state, the electrode and/or the counter-electrodes within an electrode assembly may expand in the direction of stacking of the electrodes and counter-electrodes (i.e., the electrode stacking direction). Such expansion presents challenges when the electrode assembly comprises several tens (or even more) of stacked electrodes and counter-electrodes. Advantageously, the constraint of the present disclosure maintains a pressure on the electrode assembly that inhibits expansion of the electrode assembly (in the stacking direction) during formation of the battery and/or during subsequent cycling of the battery between charged and discharged states. Additionally, the constraint further inhibits buckling of the electrode assembly that may potentially result from a difference in pressure exerted on the different surfaces of the electrode assembly by the constraint.

A constraint of the present disclosure may be embodied in any of a range of structures including, for example, the battery enclosure itself, structures external to the battery enclosure, structures internal to the battery enclosure, or even a combination of the battery enclosure, structures internal to the battery enclosure and/or structures external to the battery enclosure. In one such embodiment, the battery enclosure is a component of the constraint; stated differently, in this embodiment, the battery enclosure, alone or in combination with one or more other structures (within and/or outside the battery enclosure) exerts a pressure on the electrode structure in the electrode stacking direction that is greater than the pressure exerted on the electrode structure in directions that are mutually perpendicular and perpendicular to the electrode stacking direction. In another embodiment, the constraint does not comprise the battery enclosure and one or more discrete structures (within and/or outside the battery enclosure) other than the battery enclosure exert(s) a pressure on the electrode structure in the electrode stacking direction that is greater than the pressure exerted on the electrode structure in directions that are perpendicular to the electrode stacking direction and are mutually perpendicular.

In one exemplary embodiment, the constraint comprises one or more discrete structure(s) within the battery enclosure that exert(s) a pressure on the electrode structure in the electrode stacking direction that exceeds the pressure exerted on the electrode structure in the two directions that are perpendicular to the electrode stacking direction and are mutually perpendicular.

In one exemplary embodiment, the constraint is within the battery enclosure and exerts a pressure on the electrode structure in the electrode stacking direction that exceeds the pressure exerted on the electrode structure in the two directions that are perpendicular to the electrode stacking direction and are mutually perpendicular.

In one exemplary embodiment, the constraint comprises one or more discrete structure(s) outside the battery enclosure and one or more discrete structures within the battery enclosure that, in combination, exert(s) a pressure on the electrode structure in the electrode stacking direction that exceeds the pressure exerted on the electrode structure in the two directions that are perpendicular to the electrode stacking direction and are mutually perpendicular.

Independent of the location of the constraint (e.g., internal or external to the battery enclosure, and/or comprised by the enclosure), the constraint and battery enclosure, in combination, preferably occupy no more than 75% of the volume bounded by the outer surface of the battery enclosure (i.e., the displacement volume of the battery). For example, in one such embodiment the constraint and battery enclosure, in combination, occupy no more than 60% of the volume bounded by the outer surface of the battery enclosure. By way of further example, in one such embodiment the constraint and battery enclosure, in combination, occupy no more than 45% of the volume bounded by the outer surface of the battery enclosure. By way of further example, in one such embodiment the constraint and battery enclosure, in combination, occupy no more than 30% of the volume bounded by the outer surface of the battery enclosure. By way of further example, in one such embodiment the constraint and battery enclosure, in combination, occupy no more than 20% of the volume bounded by the outer surface of the battery enclosure.

An electrode assembly of the present disclosure generally comprises two opposing longitudinal end surfaces (separated along a longitudinal axis of the electrode assembly) and a lateral surface (that surrounds the longitudinal axis) extending between the two opposing longitudinal end surfaces. In general, the longitudinal end surfaces may be planar or non-planar. For example, in one embodiment the opposing longitudinal end surfaces are convex. By way of further example, in one embodiment the opposing longitudinal end surfaces are concave. By way of further example, in one embodiment the opposing longitudinal end surfaces are substantially planar.

The opposing longitudinal end surfaces may also have any of a range of two-dimensional shapes when projected onto a plane. For example, the longitudinal end surfaces may independently have a smooth curved shape (e.g., round, elliptical, hyperbolic or parabolic), they may independently comprise a series of lines and vertices (e.g., polygonal), or they may independently comprise a smooth curved shape and comprise one or more lines and vertices. Similarly, the lateral surface of the electrode assembly may be a smooth curved shape (e.g., the electrode assembly has a round, elliptical, hyperbolic or parabolic cross-sectional shape) or the lateral surface may comprise two or more faces connected at vertices (e.g., the electrode assembly may have a polygonal cross-section). For example, in one embodiment the electrode assembly has a cylindrical, elliptic cylindrical, parabolic cylindrical, or hyperbolic cylindrical shape. By way of further example, in one such embodiment the electrode assembly may have a prismatic shape, having opposing longitudinal end surfaces of the same size and shape and a lateral surface (i.e., the faces extending between the opposing longitudinal end surfaces) being parallelogram-shaped. By way of further example, in one such embodiment the electrode assembly has a shape that corresponds to a triangular prism, the electrode assembly having two opposing triangular longitudinal end surfaces and a lateral surface consisting of three parallelograms (e.g., rectangles) extending between the two longitudinal ends. By way of further example, in one such embodiment the electrode assembly has a shape that corresponds to a rectangular prism, the electrode assembly having two opposing rectangular longitudinal end surfaces and a lateral surface comprising four parallelogram (e.g., rectangular) faces. By way of further example, in one such embodiment the electrode assembly has a shape that corresponds to a pentagonal prism, hexagonal prism, etc. wherein the electrode assembly has two pentagonal, hexagonal, etc., respectively, opposing longitudinal end surfaces and a lateral surface comprising five, six, etc., respectively, parallelogram (e.g., rectangular) faces.

Figure 3A:
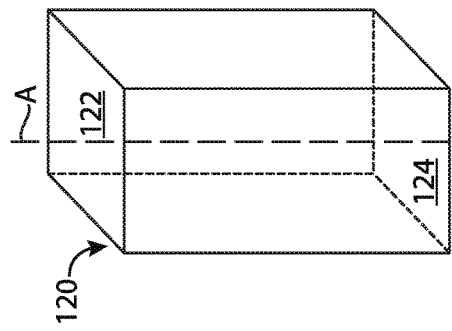
FIG. 3A is a schematic diagram of one embodiment of an electrode assembly of the present disclosure having a triangular prismatic shape.
Figure 3B:
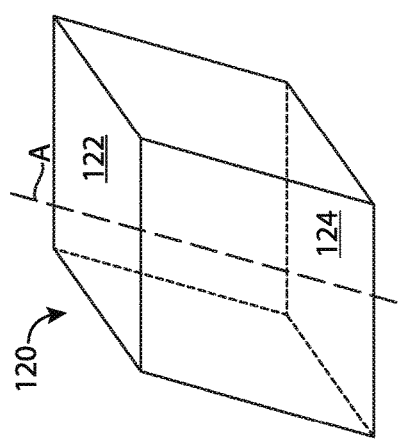
FIG. 3B is a schematic diagram of one embodiment of an electrode assembly of the present disclosure having a parallelopiped shape.
Figure 3C:
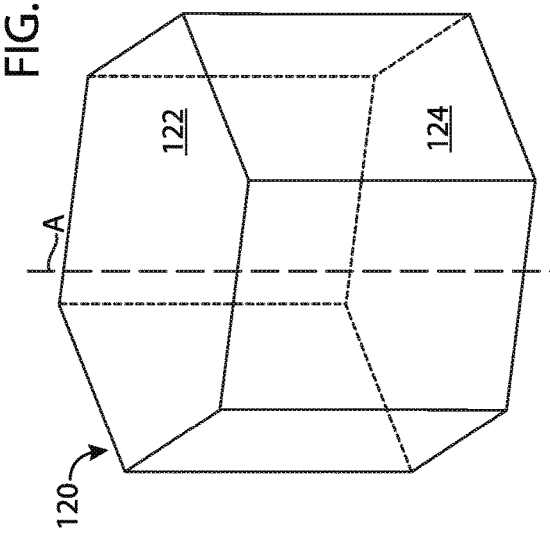
FIG. 3C is a schematic diagram of one embodiment of an electrode assembly of the present disclosure having a rectangular prismatic shape.
Figure 3D:
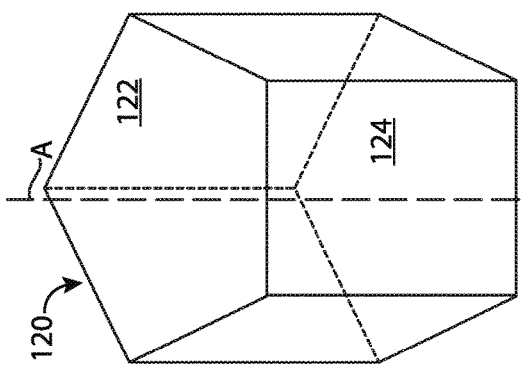
FIG. 3D is a schematic diagram of one embodiment of an electrode assembly of the present disclosure having a pentagonal prismatic shape.
Figure 3E:
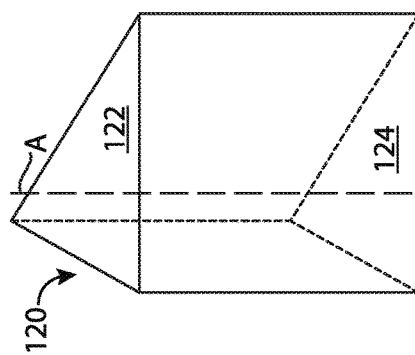
FIG. 3E is a schematic diagram of one embodiment of an electrode assembly of the present disclosure having a hexagonal prismatic shape.

Referring now to FIGS. 3A-3E, several exemplary geometric shapes are schematically illustrated for electrode assembly 120. In FIG. 3A, electrode assembly 120 has a triangular prismatic shape with opposing first and second longitudinal end surfaces 122, 124, separated along longitudinal axis A, and a lateral surface (not labeled) comprising the three rectangular faces connecting the longitudinal end surfaces and surrounding longitudinal axis A. In FIG. 3B, electrode assembly 120 has a parallelopiped shape with opposing first and second parallelogram longitudinal end surfaces 122, 124, separated along longitudinal axis A, and a lateral surface (not labeled) comprising the four parallelogram-shaped faces connecting the two longitudinal end surfaces and surrounding longitudinal axis A. In FIG. 3C, electrode assembly 120 has a rectangular prism shape with opposing first and second rectangular longitudinal end surfaces 122, 124, separated along longitudinal axis A, and a lateral surface (not labeled) comprising the four rectangular faces connecting the two longitudinal end surfaces and surrounding longitudinal axis A. In FIG. 3D, electrode assembly 120 has a pentagonal prismatic shape with opposing first and second pentagonal longitudinal end surfaces 122, 124, separated along longitudinal axis A, and a lateral surface (not labeled) comprising the five rectangular faces connecting the two longitudinal end surfaces and surrounding longitudinal axis A. In FIG. 3E, electrode assembly 120 has a hexagonal prismatic shape with opposing first and second hexagonal longitudinal end surfaces 122, 124, separated along longitudinal axis A, and a lateral surface (not labeled) comprising the six rectangular faces connecting the two longitudinal end surfaces and surrounding longitudinal axis A.

Independent of the overall geometry of the electrode assembly, the opposing first and second longitudinal end surfaces of the electrode assembly have a combined surface area that is less than 50% of the total surface area of the electrode assembly (i.e., the total surface area being the sum of the surface area of the first and second longitudinal end surfaces and the surface area of the lateral surface of the electrode assembly). For example, the first and second opposing longitudinal end surfaces 122, 124 of the electrode assembly 120 of each of FIGS. 3A-3E have a combined surface area (i.e., the sum of the surface area of the first and second longitudinal end surfaces) that is less than 50% of the total surface area of the triangular prism (FIG. 3A), parallelopipded (FIG. 3B), rectangular prism (FIG. 3C), pentagonal prism (FIG. 3D) or hexagonal prism (FIG. 3E), respectively. For example, in one such embodiment the opposing first and second longitudinal end surfaces of the electrode assembly have a surface area that is less than 33% of the total surface of the electrode assembly. By way of further example, in one such embodiment the opposing first and second longitudinal end surfaces of the electrode assembly have a surface area that is less than 25% of the total surface of the electrode assembly. By way of further example, in one such embodiment the opposing first and second longitudinal end surfaces of the electrode assembly have a surface area that is less than 20% of the total surface of the electrode assembly. By way of further example, in one such embodiment the opposing first and second longitudinal end surfaces of the electrode assembly have a surface area that is less than 15% of the total surface of the electrode assembly. By way of further example, in one such embodiment the opposing first and second longitudinal end surfaces of the electrode assembly have a surface area that is less than 10% of the total surface of the electrode assembly.

In some embodiments, the electrode assembly is a rectangular prism, and the first and second opposing longitudinal end surfaces have a combined surface area that is less than the combined surface area of at least two opposing faces of the lateral surface (i.e., the sum of the surface areas of two opposing rectangular side faces connecting the opposing longitudinal end surfaces). In some embodiments, the electrode assembly is a rectangular prism, the rectangular prism has first and second opposing longitudinal end surfaces and a lateral surface comprising two pairs of opposing surfaces (faces) and the two opposing longitudinal end surfaces have a combined surface area that is less than the combined surface area of at least one pair of the two pair of opposing faces comprised by the lateral surface. In some embodiments, the electrode assembly is a rectangular prism, the rectangular prism has two opposing first and second longitudinal end surfaces and a lateral surface comprising two pairs of opposing surfaces (faces) and the two opposing longitudinal end surfaces have a combined surface area that is less than the combined surface area of each pair of the two pair of opposing faces comprised by the lateral surface.

Figure 2:
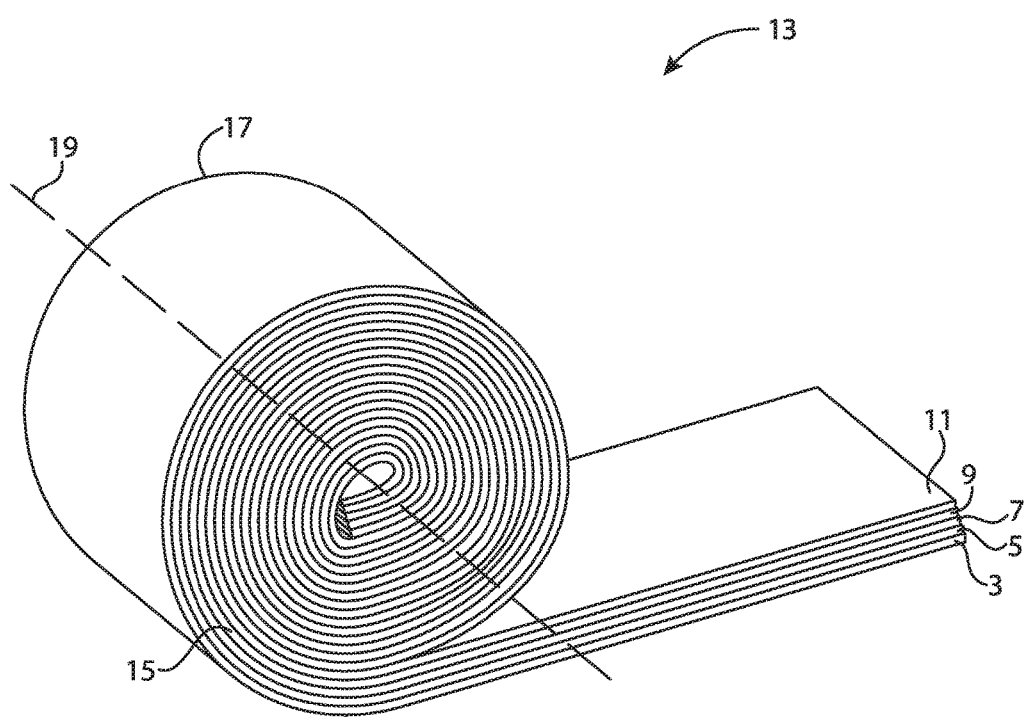
FIG. 2 is a cross-section of a cell of a wound electrochemical stack of a prior art, two-dimensional energy storage device, such as a lithium ion battery.

In general, the electrode assembly comprises a population of electrodes and a population of counter-electrodes stacked in a direction (i.e., the electrode stacking direction) that coincides with the longitudinal axis of the electrode assembly (see, e.g., FIGS. 3A-3E). Stated differently, the electrodes and counter-electrodes are stacked in a direction extending from the first to the second opposing longitudinal end surfaces of the electrode assembly. In one embodiment, members of the electrode population and/or members of the counter-electrode population are laminar in nature (see, e.g., FIGS. 1 and 2). In another embodiment, members of the electrode population and/or members of the counter-electrode population are non-laminar in nature; stated differently, in one embodiment members of the electrode and/or counter-electrode populations extend sufficiently from an imaginary backplane (e.g., a plane substantially coincident with a surface of the electrode assembly) to have a surface area (ignoring porosity) that is greater than twice the geometrical footprint (i.e., projection) of the members in the backplane. In certain embodiments, the ratio of the surface area of a non-laminar (i.e., three-dimensional) electrode and/or counter-electrode structure to its geometric footprint in the imaginary backplane may be at least about 5, at least about 10, at least about 50, at least about 100, or even at least about 500. In general, however, the ratio will be between about 2 and about 1000. In one such embodiment, members of the electrode population are non-laminar in nature. By way of further example, in one such embodiment, members of the counter-electrode population are non-laminar in nature. By way of further example, in one such embodiment, members of the electrode population and members of the counter-electrode population are non-laminar in nature.

Expansion of the electrode assembly in the longitudinal direction (e.g., in a direction parallel to longitudinal axis A in each of FIGS. 3A-3E), during formation and/or during cycling of a secondary battery incorporating the electrode assembly may be inhibited by a constraint of the present disclosure. In general, the constraint comprises compression members (adapted to overlie the first and second projected areas, respectively) that are connected by tension members (adapted to overlie the lateral surface of the electrode assembly). The tension members tend to pull the compression members toward each other and thereby apply a compressive force to the opposing first and second longitudinal end surfaces of the electrode assembly which, in turn, inhibits expansion of the electrode assembly in the longitudinal direction (which coincides with the electrode stacking direction as further described herein). In addition, after battery formation the constraint exerts a pressure on the electrode assembly in the longitudinal direction (i.e., electrode stacking direction) that exceeds the pressure maintained on the electrode assembly in each of the two directions that are mutually perpendicular to each other and are perpendicular to the longitudinal direction.

Figure 4:
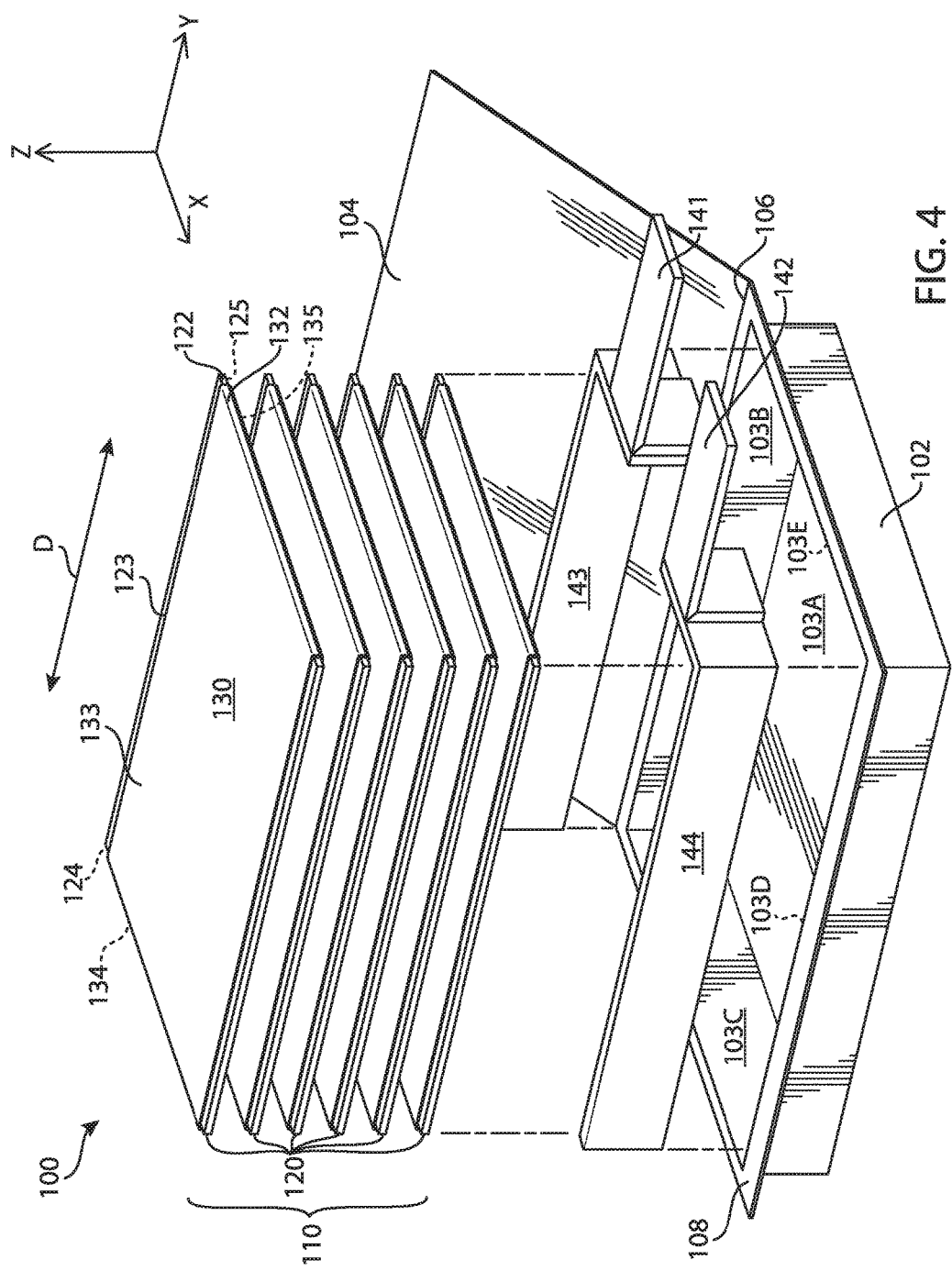
FIG. 4 is a schematic exploded view of one embodiment of a secondary battery of the present disclosure.

Referring now to FIG. 4, there can be seen an exploded view of one embodiment of a secondary battery of the present disclosure, generally indicated at 100. The secondary battery includes battery enclosure 102 and a set 110 of electrode assemblies 120 within the battery enclosure 102, each of the electrode assemblies having a first longitudinal end surface 122, an opposing second longitudinal end surface 124 (separated from first longitudinal end surface 122 along a longitudinal axis (not shown) that parallels the "Y-axis" of the imaginary Cartesian coordinate system of FIG. 4), and a lateral surface comprising lateral faces 123, 125, 126, 127 (see, FIG. 12A). Each electrode assembly comprises a population of electrode structures and a population of counter-electrode structures, stacked relative to each other within each of the electrode assembly (see, e.g., FIG. 12A) in an electrode stacking direction D; stated differently, the populations of electrode and counter-electrode structures are arranged in an alternating series of electrodes and counter-electrodes with the series progressing in direction D between first and second longitudinal end surfaces 122, 124 (see, e.g., FIG. 12A; as illustrated in FIG. 4, electrode stacking direction D parallels the Y-axis of the imaginary Cartesian coordinate system of FIG. 4). In addition, the electrode stacking direction D within an individual electrode assembly 120 is perpendicular to the direction of stacking of a collection of electrode assemblies 120 within a set 110 (i.e., the electrode assembly stacking direction); stated differently, the electrode assemblies are disposed relative to each other in a direction within a set 110 that is perpendicular to the electrode stacking direction D within an individual electrode assembly (e.g., the electrode assembly stacking direction is in a direction corresponding to the Z-axis of the imaginary Cartesian coordinate system whereas the electrode stacking direction D within individual electrode assemblies is in a direction corresponding to the Y-axis of the imaginary Cartesian coordinate system).

Tabs 141, 142 project out of the battery enclosure and provide an electrical connection between the electrode assemblies of set 110 and an energy supply or consumer (not shown). More specifically, in this embodiment tab 141 is electrically connected to tab extension 143 (using, for example, an electrically conductive glue), and tab extension 143 is electrically connected to the electrodes comprised by each of the electrode assemblies 120. Similarly, tab 142 is electrically connected to tab extension 144 (using, for example, an electrically conductive glue), and tab extension 144 is electrically connected to the counter-electrodes comprised by each of electrode assemblies 120.

Figure 5A:
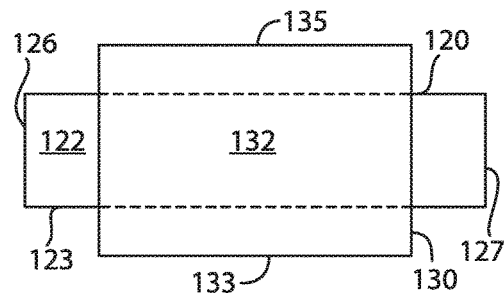
FIG. 5A is a schematic end view of one end of an electrode assembly of the secondary battery of FIG. 4.
Figure 5B:
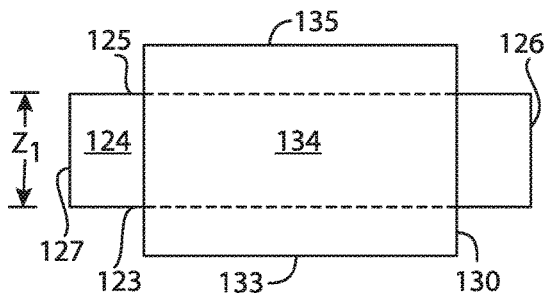
FIG. 5B is a schematic end view of the opposing end of the electrode assembly of FIG. 5A.
Figures 5C, 5D:
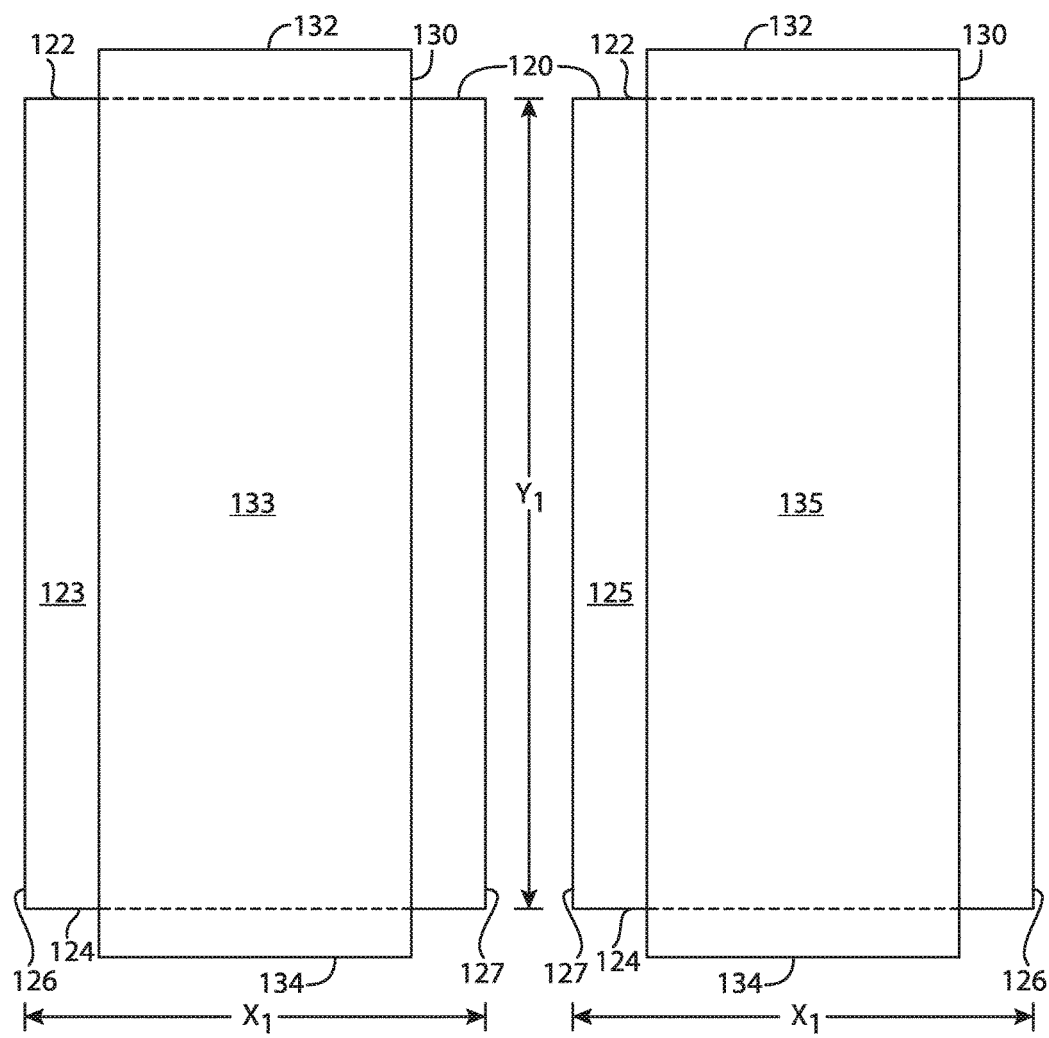
FIG. 5C is a schematic top view of a lateral surface of an electrode assembly of FIG. 5A.
FIG. 5D is a schematic bottom view of the opposing lateral surface of the electrode assembly of FIG. 5A.

Each electrode assembly 120 in the embodiment illustrated in FIG. 4 has an associated constraint 130 to inhibit expansion in the longitudinal direction (i.e., electrode stacking direction D). Each constraint 130 comprises compression members 132, 134 which overlie first and second longitudinal end surfaces 122, 124, respectively, (see FIGS. 5A and 5B) and tension members 133, 135 which overlie lateral faces 123, 125 respectively (see FIGS. 5C and 5D). Tension members 133, 135 pull compression members 132, 134 toward each other, and compression members 132, 134 apply a compressive force to the opposing first and second longitudinal end surfaces 122, 124. As a result, expansion of the electrode assembly in the longitudinal direction is inhibited during formation and/or cycling of the battery between charged and discharged states. Additionally, constraint 130 exerts a pressure on the electrode assembly in the longitudinal direction (i.e., electrode stacking direction D) that exceeds the pressure maintained on the electrode assembly in either of the two directions that are mutually perpendicular to each other and are perpendicular to the longitudinal direction (as illustrated, the longitudinal direction corresponds to the direction of the "Y" axis and the two directions that are mutually perpendicular to each other and to the longitudinal direction correspond to the directions of the X-axis and the Z-axis, respectively, of the illustrated imaginary Cartesian coordinate system).

Referring now to FIGS. 5A, 5B, 5C, and 5D, each electrode assembly 120 in the embodiment of FIG. 4 has a geometric shape corresponding to that of a rectangular prism with first and second longitudinal end surfaces 122, 124 having the dimensions $X_1$ by $Z_1$, lateral faces 123, 125 having the dimensions $X_1$ by $Y_1$ and lateral faces 126, 127 having the dimensions $Y_1$ by $Z_1$ (wherein $X_1$, $Y_1$ and $Z_1$ are dimensions measured in directions corresponding to the X, Y and Z-axes, respectively, of a Cartesian coordinate system). The first and second longitudinal end surfaces 122, 124 thus have a surface area corresponding to the multiplication product of $X_1$ and lateral faces 123, 125 each have a surface area corresponding to the multiplication product of $X_1$ and $Y_1$, and lateral faces 126, 127 each have a surface area corresponding to the multiplication product of $Y_1$ and $Z_1$. In accordance with one aspect of the present disclosure, the sum of the surface areas of the first and second longitudinal end surfaces is less than 33% of the surface area of the total surface of the electrode assembly wherein the electrode assembly is a rectangular prism and the combined surface area of the first and second longitudinal end surfaces is equal to $(X_1*Z_1)+(X_1*Z_1)$ and the surface area of the lateral surface is equal to $(X_1*Y_1)+(X_1*Y_1)(Y_1*Z_1)(Y_1*Z_1)$. For example, in one such embodiment the sum of the surface areas of the first and second longitudinal end surfaces is less than 25% of the surface area of the total surface of the electrode assembly wherein the combined surface area of the first and second longitudinal end surfaces is equal to $(X_1*Z_1)+(X_1*Z_1)$ and the total surface area of the electrode assembly is equal to $(X_1*Y_1)+(X_1*Y_1)(Y_1*Z_1)(Y_1*Z_1)+(X_1*Z_1)+(X_1*Z_1)$.

Each constraint 130 in this embodiment comprises compression members 132, 134 which overlie first and second longitudinal end surfaces 122, 124, respectively, and at least one tension member that pulls the compression members towards each other. For example, the constraint can comprise tension members 133, 135 that overlie lateral faces 123, 125, respectively, of the lateral surface. In general, compression members 132, 134 exert a pressure on first and second longitudinal end surfaces 122, 124 (i.e., in the electrode stacking direction D) that exceeds the pressure maintained on lateral faces 123, 125 and on lateral faces 126, 127 of the electrode assembly (i.e., in each of the two directions that are mutually perpendicular to each other and are perpendicular to the electrode stacking direction). For example, in one such embodiment the constraint exerts a pressure on first and second longitudinal end surfaces 122, 124 (i.e., in the electrode stacking direction D) that exceeds the pressure maintained on the electrode assembly in at least one or even both of the two directions that are perpendicular to the electrode stacking direction and are mutually perpendicular by a factor of at least 3. By way of further example, in one such embodiment the constraint exerts a pressure on first and second longitudinal end surfaces 122, 124 (i.e., in the electrode stacking direction D) that exceeds than the pressure maintained on the electrode assembly in at least one or even both of the two directions that are perpendicular to the electrode stacking direction and are mutually perpendicular by a factor of at least 4. By way of further example, in one such embodiment the constraint exerts a pressure on first and second longitudinal end surfaces 122, 124 (i.e., in the electrode stacking direction D) that exceeds than the pressure maintained on the electrode assembly in at least one or even both of the two directions that are perpendicular to the electrode stacking direction and are mutually perpendicular by a factor of at least 5.

Figure 6A:
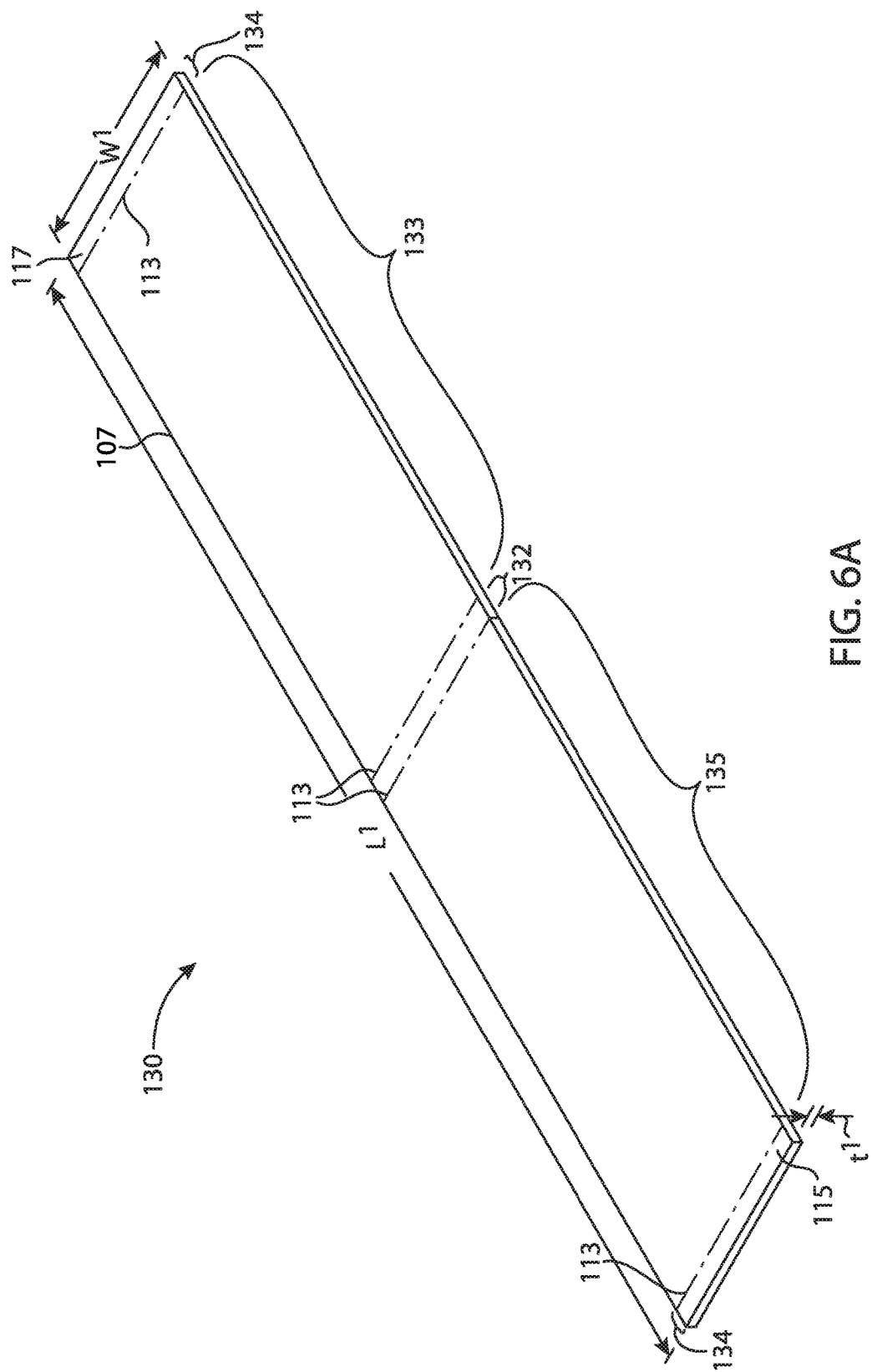
FIG. 6A is a schematic perspective view of a constraint of the secondary battery of FIG. 4.

Referring now to FIG. 6A, in one embodiment constraint 130 may be derived from a sheet 107 having length $L_1$, width $W_1$ and thickness $t_1$. To form the constraint, sheet 107 is simply wrapped around electrode structure 120 (see FIGS. 4 and 5A-5D) and folded at fold lines 113 to enclose the electrode structure. Edges 115, 117 overlap each other, and are welded, glued or otherwise secured to each other to form a constraint comprising compression members 132, 134 (compression member 134 comprising overlapping edges 115, 177 once secured to each other) and tension members 133, 135. In this embodiment, the constraint has a volume corresponding to the displacement volume of sheet 107 (i.e., the multiplication product of $L_1$, $W_1$ and $t_1$).

Sheet 107 may comprise any of a wide range of compatible materials capable of applying the desired force to the electrode structure. In general, the constraint will typically comprise a material that has an ultimate tensile strength of at least 10,000 psi (>70 MPa), that is compatible with the battery electrolyte, does not significantly corrode at the floating or anode potential for the battery, and does not significantly react or lose mechanical strength at 45° C. For example, the constraint may comprise any of a wide range of metals, alloys, ceramics, glass, plastics, or a combination thereof (i.e., a composite). In one exemplary embodiment, constraint comprises a metal such as stainless steel (e.g., SS 316, 440C or 440C hard), aluminum (e.g., aluminum 7075-T6, hard H18), titanium (e.g., 6Al-4V), beryllium, beryllium copper (hard), copper ($O_2$ free, hard), nickel; in general, however, when the constraint comprises metal it is generally preferred that it be incorporated in a manner that limits corrosion and from creating an electrical short between the electrodes and counter-electrodes. In another exemplary embodiment, the constraint comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the constraint comprises a glass such as Schott D263 tempered glass. In another exemplary embodiment, the constraint comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the constraint comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the constraint comprises fibers such as Kevlar 49 Aramid Fiber, S Glass Fibers, Carbon Fibers, Vectran UM LCP Fibers, Dyneema, Zylon.

Thickness ($t_1$) of the constraint will depend upon a range of factors including, for example, the material(s) of construction of the constraint, the overall dimensions of the electrode assembly, and the composition of the battery anode and cathode. In some embodiments, for example, the constraint will comprise a sheet having a thickness in the range of about 10 to about 100 micrometers. For example, in one such embodiment the constraint comprises a stainless steel sheet (e.g., SS316) having a thickness of about 30 µm. By way of further example, in another such embodiment the constraint comprises an aluminum sheet (e.g., 7075-T6) having a thickness of about 40 µm. By way of further example, in another such embodiment the constraint comprises a zirconia sheet (e.g., Coorstek YZTP) having a thickness of about 30 µm. By way of further example, in another such embodiment the constraint comprises an E Glass UD/Epoxy 0 deg sheet having a thickness of about 75 µm. By way of further example, in another such embodiment the constraint comprises 12 µm carbon fibers at >50% packing density.

In certain embodiments, the compression members and/or the tension members of the constraint comprise a porous material. In general, a porous material would permit electrolyte to readily access the electrode assemblies. For example, in some embodiments the compression member(s) and/or the tension member(s) may have a void fraction of at least 0.25. By way of further example, in some embodiments the compression member(s) and/or the tension member(s) may have a void fraction of at least 0.375. By way of further example, in some embodiments the compression member(s) and/or the tension member(s) may have a void fraction of at least 0.5. By way of further example, in some embodiments the compression member(s) and/or the tension member(s) may have a void fraction of at least 0.625. By way of further example, in some embodiments the compression member(s) and/or the tension member(s) may have a void fraction of at least 0.75.

Figure 6B:
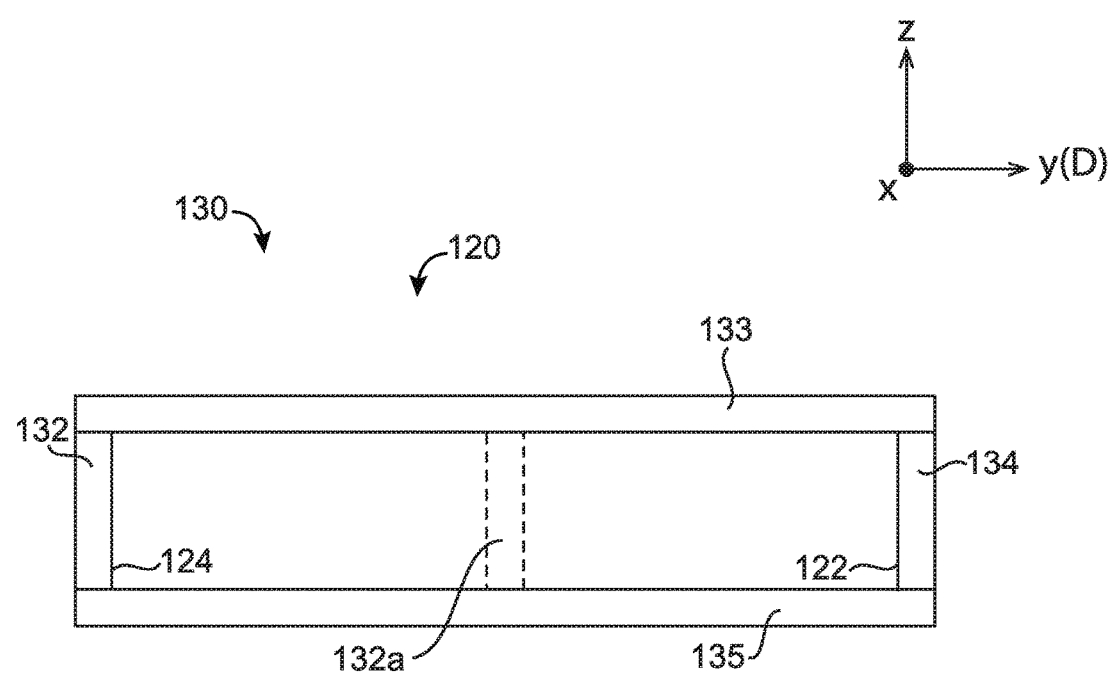
FIG. 6B is illustrates an embodiment of cross section of an electrode assembly having a constraint with an internal compression member.

In yet another embodiment, the constraint 130 comprises one or more compression members that are internal to the electrode assembly 120. For example, referring now to FIG. 6B, a cross-section of an embodiment of an electrode assembly 120 with constraint 130 having an internal compression member 132a is shown. In the embodiment shown in FIG. 6B, the constraint 130 can comprise first and second compression members 132, 134, respectively, at the longitudinal end surfaces 122, 124 of the electrode assembly 120. However, additionally and/or alternatively, the constraint 130 can further comprise at least one internal compression member 132a that is located at an internal region of the electrode assembly that is other than at the longitudinal end surfaces 122, 124. The internal compression member 132a may be connected to tension members 133, 135 to impose a compressive pressure on a portion of the electrode assembly 120 between the internal compression member 132a and another compression member, such as one or more of the compression members 132, 134 at the longitudinal end surfaces 122, 124 of the electrode assembly 120, and/or with one or more other internal compression members 132. Referring to the embodiment shown in FIG. 6B, an internal compression member 132a can be provided that is spaced apart along the longitudinal axis (stacking direction D) away from the first and second longitudinal end surfaces 122, 124, respectively, of the electrode assembly 120, such as toward a central region of the electrode assembly 120. The internal compression member 132a can connect to tension members 133, 135 at an interior position from the electrode assembly end surfaces 122, 124. In one embodiment, the at least one internal compression member 132a at the interior position from the end surfaces 122, 124 is provided in addition to compression members 132, 134 provided at the electrode assembly end surfaces 122, 124. In another embodiment, the constraint 130 comprises internal compression members 132a at interior positions of the electrode assembly 120 that are spaced apart interiorly from the longitudinal end surfaces 122, 124, with or without compression members 132, 134 at the longitudinal end surfaces 122, 124. In yet another embodiment, the constraint 130 comprises internal compression members 132a at interior positions of the electrode assembly that are spaced apart interiorly from the longitudinal end surfaces 122, 124, without having compression member 132, 134 at the longitudinal end surfaces 122, 124. In one embodiment, an internal compression member 132a may be understood as acting in concert with one or more of the compression members 132, 134 and/or another internal compression member 132a to exert a compressive pressure on each portion of the electrode assembly 120 lying in the longitudinal direction between the internal compression member 132a and the longitudinal surfaces 122, 124 of the electrode assembly 120 where the compression members 132, 134, can be located, and/or to exert a compressive pressure on a portion of the electrode assembly 120 lying in the longitudinal direction between the internal compression member 132a and another internal compression member 132a. In one version, at least one of the internal compression members 132a comprises at least a portion of an electrode or counter electrode structure 151, 152, as described in further detail below. For example, the internal compression member 132a can comprise at least a portion of a counter electrode active material, a separator, an electrode current collector, a counter electrode current collector, an electrode backbone and a counter-electrode backbone.

According to one embodiment, as discussed above, the constraint 130 can include an internal compression member 132a that is a part of an interior structure of the electrode assembly 106, such as a part of an electrode 151 and/or counter-electrode structure 152. In one embodiment, by providing compression between structures within the electrode assembly 120, a tightly constrained structure can be realized that adequately compensates for strain produced by growth of the electrode structure 120. For example, in one embodiment, one or more internal compression members 132 can act in concert with compression members 132, 134 at the longitudinal end surfaces 122, 124 of the electrode assembly 120, to constrain growth in a direction parallel to the longitudinal direction, by being placed in tension with one another via connecting tension members 133, 135. In yet a further embodiment, growth of an electrode structure 151 (e.g., an anode structure) can be countered by compression via one or more internal compression members 132a corresponding to portions of counter-electrode structures 152 (e.g., cathode) that are placed in tension with one another via the tension members 133, 135.

In general, in certain embodiments, components of the constraint 130 may be embodied as the electrode 151 and/or counter-electrode structures 152, respectively, within an electrode assembly 120, not only to provide effective restraint but also to more efficiently utilize the volume of the electrode assembly 120 without excessively increasing the size of a secondary battery having the electrode assembly 120. For example, in one embodiment, constraint 130 can comprise tension members 133, 135 attached to one or more electrode structures 151 and/or counter electrode structures 152 serving as the internal compression member 132a. By way of further example, in certain embodiments, the at least one internal compression member 132a may be embodied as the population of electrode structures 151. By way of further example, in certain embodiments, the at least one internal compression member 132a may be embodied as the population of counter-electrode structures 152.

Figure 6C:
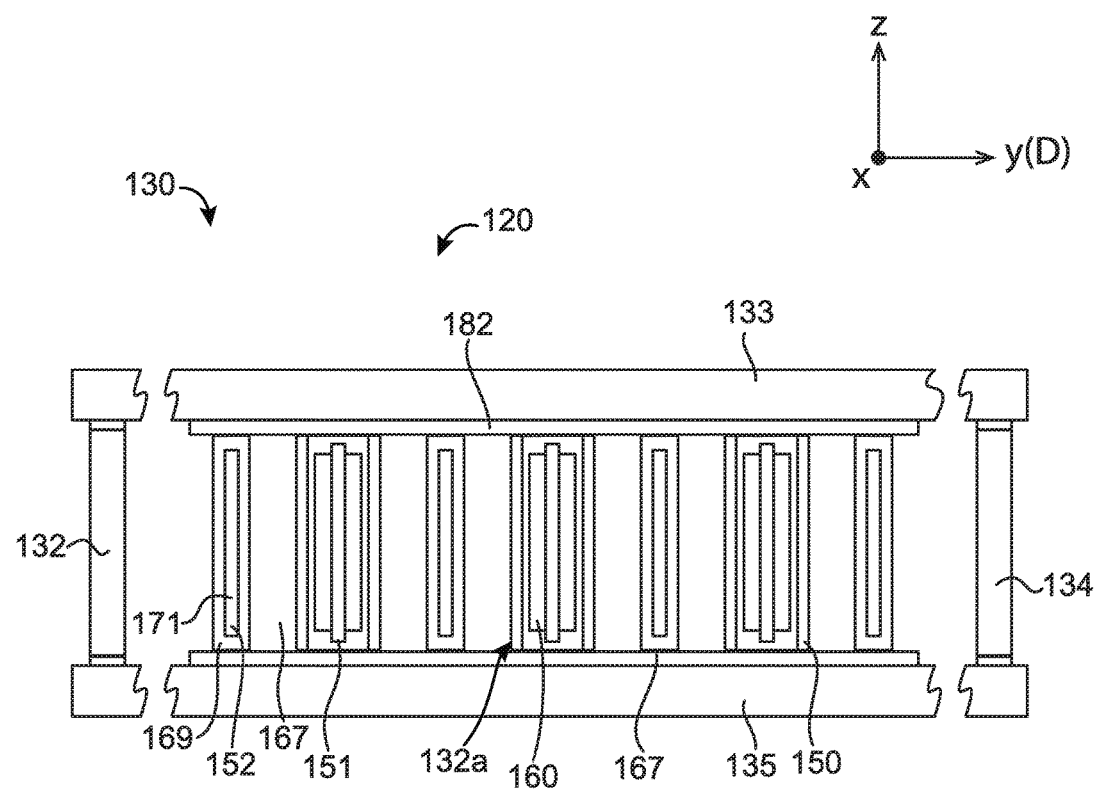
FIG. 6C illustrates an embodiment of a cross-section of an electrode assembly having a constraint with a plurality of internal compression member.
Figure 7:
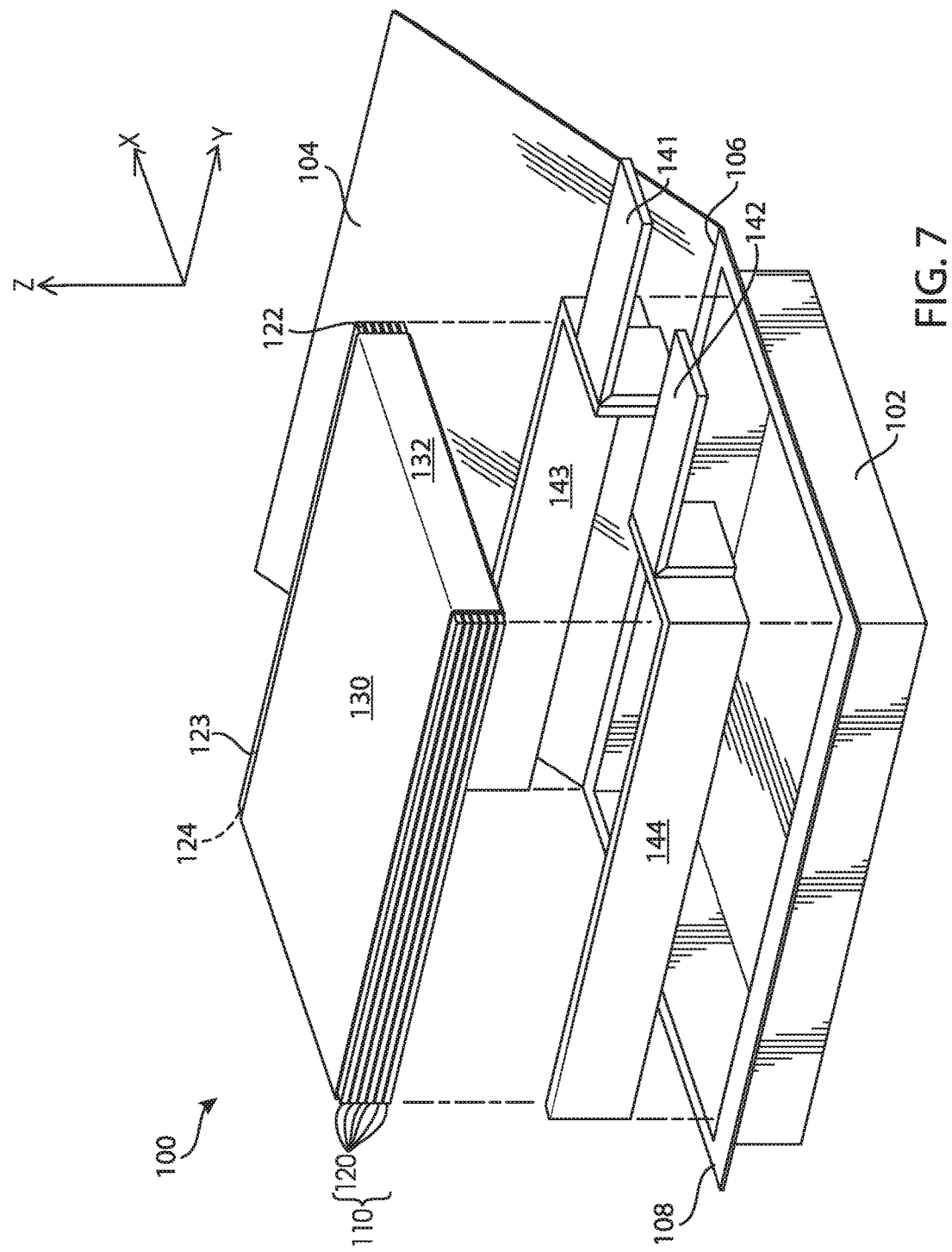
FIG. 7 is a schematic exploded view of an alternative embodiment of a secondary battery of the present disclosure.
Figure 8:
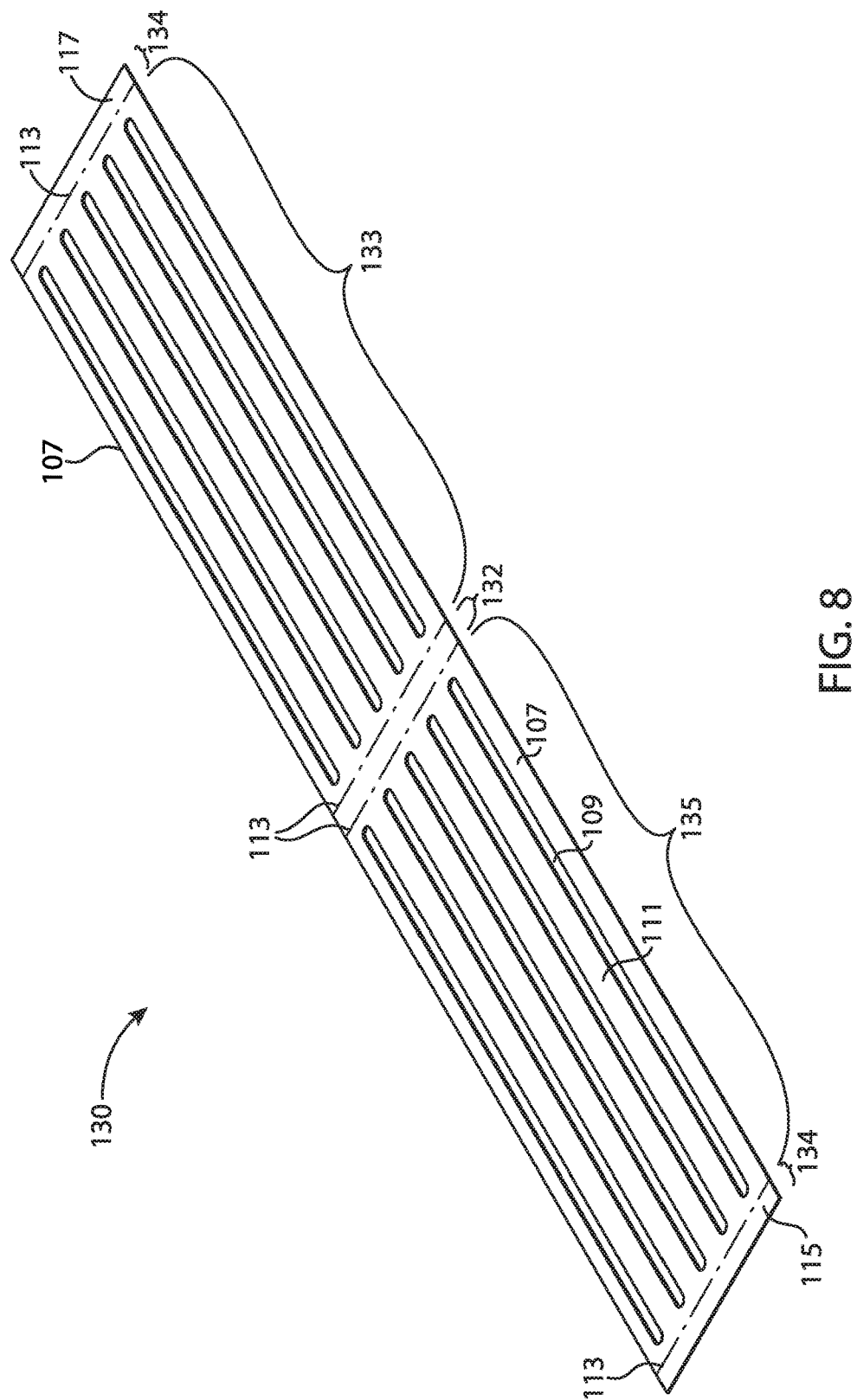
FIG. 8 is a schematic diagram of an alternative embodiment of a constraint for an electrode assembly of a secondary battery of the present disclosure in unfolded form.
Figure 9:
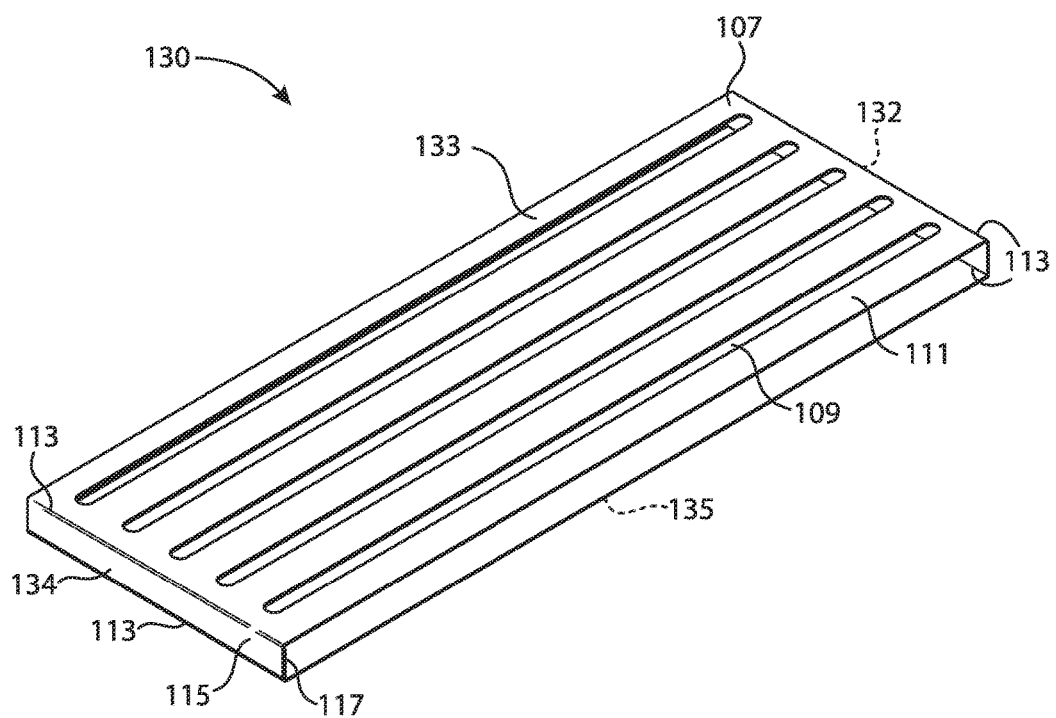
FIG. 9 is a schematic diagram of the constraint of FIG. 8, after folding.
Figure 10A:
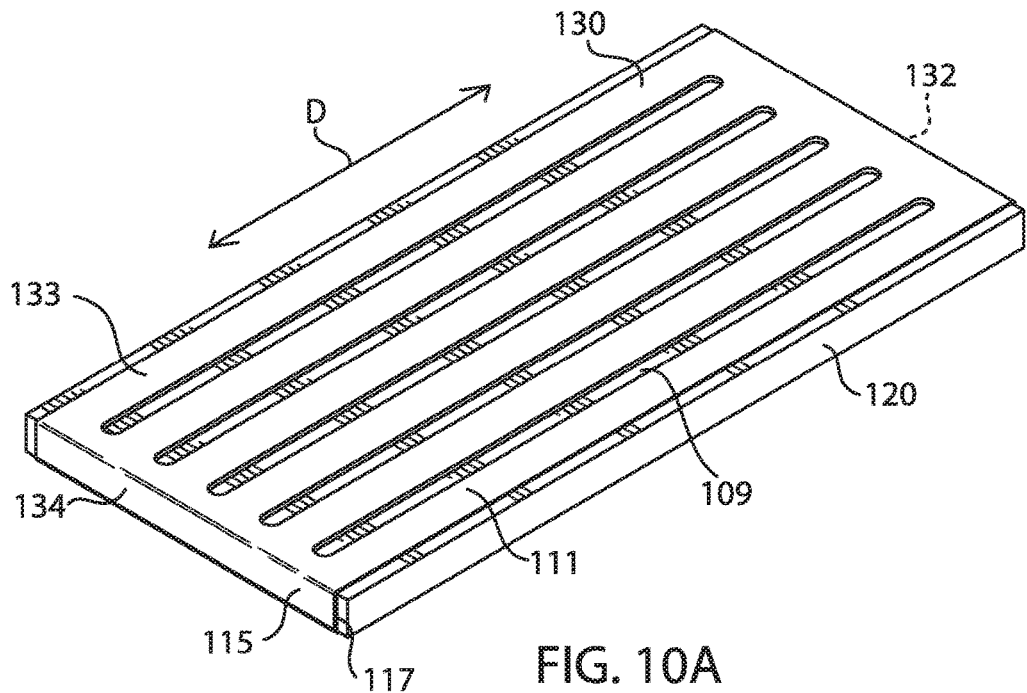
FIG. 10A is a schematic diagram of an alternative embodiment of a constraint and an electrode assembly of a secondary battery of the present disclosure.
Figure 10B:
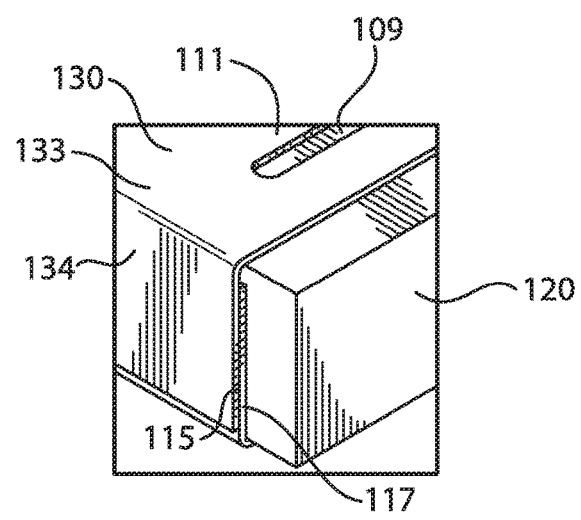
FIG. 10B is an enlarged view of the constraint and electrode assembly of FIG. 10A.

Referring now to FIG. 6C, a Cartesian coordinate system is shown for reference having a vertical axis (Z axis), a longitudinal axis (Y axis), and a transverse axis (X axis); wherein the X axis is oriented as coming out of the plane of the page; and a designation of the stacking direction D, as described above, co-parallel with the Y axis. More specifically, FIG. 7 shows a cross section of an electrode assembly 120 having a constraint 130 with compression members 132, 134 at the longitudinal surfaces thereof, and at least one internal compression member 132a. The constraint 130 includes the compression members 132, 134, as well as the internal compression member embodied as the population of electrode structures 151 and/or the population of counter-electrode structures 152; therefore, in this embodiment, the at least one internal compression member 132a, electrode structures 151, and/or counter-electrode structures 152 can be understood to be interchangeable. Furthermore, a separator 150 may also form a portion of an internal compression member 132a. More specifically, illustrated in FIG. 6C is one embodiment of a flush connection of the internal compression member 132a corresponding to the electrode 151 or counter-electrode structure 152. The flush connection may further include a layer of glue 182 of other means of adhesion between the tension members 133, 135 and the internal compression member 132a. The layers of glue 182 affix the internal compression member 132a to the tension members 133, 135, such that the internal compression member 132a can be maintained in tension with other compression members, such as other internal compression members or compression members at the longitudinal end surfaces of the electrode assembly 120.

Further illustrated in FIG. 6C, in one embodiment, members of the electrode population 151 having an electrode active material layer 160, an electrode current collector 163 (such as an ionically porous electrode current collector), and an electrode backbone 165 that supports the electrode active material layer 160 and the electrode current collector 163. Similarly, in one embodiment, illustrated in FIG. 6C are members of the counter-electrode population 152 having a counter-electrode active material layer 167, a counter-electrode current collector 169, and a counter-electrode backbone 171 that supports the counter-electrode active material layer 167 and the counter-electrode current collector 169.

Without being bound to any particular theory (e.g., as in FIG. 6C), in certain embodiments, members of the electrode population 151 include an electrode active material layer 160, an electrode current collector 163, and an electrode backbone 165 that supports the electrode active material layer 160 and the electrode current collector 163. Similarly, in certain embodiments, members of the counter-electrode population 152 include a counter-electrode active material layer 167, a counter-electrode current collector 169, and a counter-electrode backbone 171 that supports the counter-electrode active material layer 167 and the counter-electrode current collector 169. In one embodiment, at least a portion of any of the electrode and counter-electrode structures 151, 152, such as the current collectors 163, 169, backbones 165, 171, counter electrode active material layer 167, as well as the separator 130, may serve as a part or the entire internal compression member 132a, such as by being connected to tension members 133, 135 or otherwise being placed in tension with one or more other internal or external compression member 132, 134. In one embodiment, the internal compression members 132a may be connected to tension members 133, 135, by at least one of gluing, welding, bonding, adhering, or similar connection means. While the embodiment shown in FIG. 6C depicts internal compression members 132a corresponding to both electrode and counter-electrode structures 151, 152 (i.e., both electrode and counter electrode structures are placed in tension with each other by being connected to tension members 133, 135), in alternative embodiment only one of the electrode and/or counter-electrode structures serves as internal compression members 132a, and/or only a portion of an electrode or counter-electrode structure 151, 152 may serve as the internal compression member 132a, such as by being adhered to the tension members 133, 135. For example, in one embodiment a current collector, such as at least one of an electrode current collector 163 and/or a counter-electrode current collector 152 may serve as an internal compression member 132, such as by being adhered to the tension members 133, 135.

Referring again to FIG. 4, to complete the manufacture of the secondary battery 100, battery enclosure 102 is filled with a non-aqueous electrolyte (not shown) and lid 104 is folded over (along fold line 106) and sealed to upper surface 108. When fully assembled, the sealed secondary battery occupies a volume bounded by its exterior surfaces (i.e., the displacement volume), the secondary battery enclosure 102 occupies a volume corresponding to the displacement volume of the battery (including lid 104) less its interior volume (i.e., the prismatic volume bounded by interior surfaces 103A, 103B, 103C, 103D, 103E and lid 104) and each constraint 130 of set 110 occupies a volume corresponding to its respective displacement volume. In combination, therefore, the battery enclosure and constraints occupy no more than 75% of the volume bounded by the outer surface of the battery enclosure (i.e., the displacement volume of the battery). For example, in one such embodiment the constraints and battery enclosure, in combination, occupy no more than 60% of the volume bounded by the outer surface of the battery enclosure. By way of further example, in one such embodiment the constraint and battery enclosure, in combination, occupy no more than 45% of the volume bounded by the outer surface of the battery enclosure. By way of further example, in one such embodiment the constraint and battery enclosure, in combination, occupy no more than 30% of the volume bounded by the outer surface of the battery enclosure. By way of further example, in one such embodiment the constraint and battery enclosure, in combination, occupy no more than 20% of the volume bounded by the outer surface of the battery enclosure.

For ease of illustration in FIG. 4, secondary battery 100 comprises only one set 110 of electrode assemblies and the set comprises only six electrode assemblies 120. In practice, the secondary battery may comprise more than one set of electrode assemblies, with each of the sets being disposed laterally relative to each other (e.g., in a relative direction lying within the X-Y plane of the Cartesian coordinate system of FIG. 4) or vertically relative to each other (e.g., in a direction substantially parallel to the Z-axis of the Cartesian coordinate system of FIG. 4). Additionally, in each of these embodiments each of the sets of electrode assemblies may comprise one or more electrode assemblies. For example, in certain embodiments the secondary battery may comprise one, two or more sets of electrode assemblies, with each such set comprising one or more electrode assemblies (e.g., 1, 2, 3, 4, 5, 6, 10, 15 or more electrode assemblies within each such set) and, when the battery comprises two or more such sets, the sets may be laterally or vertically disposed relative to other sets of electrode assemblies comprised the secondary battery. In each of these various embodiments, each individual electrode assembly may have its own constraint (i.e., a 1:1 relationship between electrode assemblies and constraints), two more electrode assemblies may have a common constraint (i.e., a single constraint for two or more electrode assemblies) or two or more electrode assemblies may share components of a constraint (i.e., two more or more electrode assemblies may have a common compression member and/or tension members).

Figure 12A:
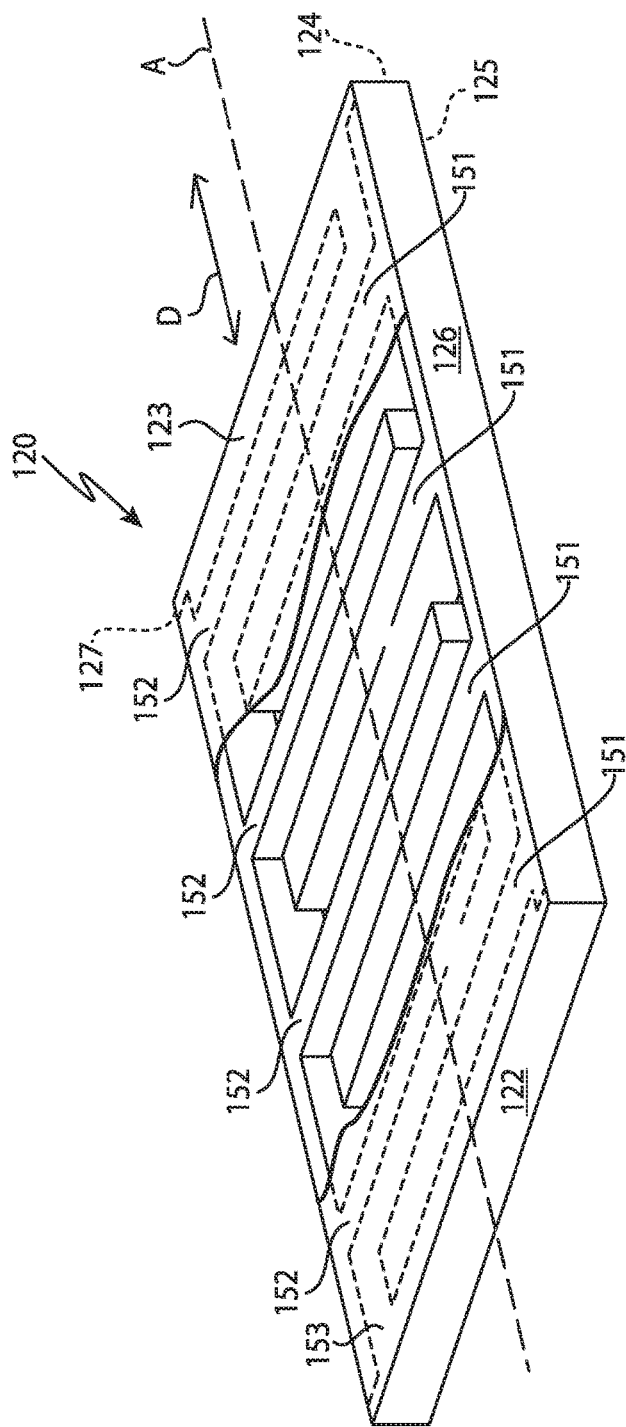
FIG. 12A is a perspective view of one embodiment of an electrode assembly of a secondary battery of the present disclosure with parts broken away to show internal construction.

Referring now to FIG. 12A, in one exemplary embodiment the electrode assembly 120 comprises first and second longitudinal end surfaces 121, 122 and a lateral surface comprising lateral faces 123, 124, 125, 126. Electrode assembly 120 further comprises a population of electrode structures 151 and a population of counter-electrode structures 152 that are stacked in an electrode stacking direction D that parallels longitudinal axis A extending between the opposing first and second longitudinal end surfaces 121, 122. The electrode and counter-electrode structures 151, 152 are stacked in an alternating sequence (e.g., interdigitated), with substantially each member of the electrode population being between two members of the counter-electrode population and substantially each member of the counter-electrode population being between two members of the electrode population. For example, and with the exception of the first and last electrode or counter-electrode structure in the alternating series, in one embodiment each electrode structure in the alternating series is between two counter-electrode structures and each counter-electrode structure in the series is between two electrode structures. Additionally, a ratio of the surface area of the non-laminar electrode and the counter-electrode structures to their respective geometric footprint in an imaginary backplane (e.g., lateral faces 126, 127, respectively) may be at least about 5, at least about 10, at least about 50, at least about 100, or even at least about 500 as previously noted.

As illustrated in FIG. 12A, with one exception, each member 151 of the population of electrode structures is between two members 152 of the counter-electrode population and, with one exception, each member 152 of the population of counter-electrode structures is between two members 151 of the population of electrode structures. Stated more generally, in one embodiment the electrode and counter-electrode populations each have N members, each of N−1 electrode population members is between two counter-electrode structures, each of N−1 counter-electrode population members is between electrode structures, and N is at least 2. For example, in one embodiment, N is at least 4 (as illustrated in FIG. 4), at least 5, at least 10, at least 25, at least 50 or even at least 100.

Figure 12C:
FIG. 12C is an end view of the opposing end of the electrode assembly of FIG. 12A.
Figure 12B:
FIG. 12B is an end view of one end of the electrode assembly of FIG. 12A.

Referring now to FIGS. 12B and 12C, a projection of the members of the electrode and counter-electrode populations onto first longitudinal end surface 122 circumscribes a first projected area 162 and a projection of the members of the electrode and counter-electrode populations onto second longitudinal end surface 124 circumscribes a second projected area 164. In general, first and second projected areas 162, 164 will typically comprise a significant fraction of the surface area of the first and second longitudinal end surfaces 122, 124, respectively. For example, in one embodiment the first and second projected areas each comprise at least 50% of the surface area of the first and second longitudinal end surfaces, respectively. By way of further example, in one such embodiment the first and second projected areas each comprise at least 75% of the surface area of the first and second longitudinal end surfaces, respectively. By way of further example, in one such embodiment the first and second projected areas each comprise at least 90% of the surface area of the first and second longitudinal end surfaces, respectively.

Members of the electrode and counter-electrode populations comprise an electroactive material capable of absorbing and releasing a carrier ion such as lithium, sodium, potassium, calcium, magnesium or aluminum ions. In some embodiments, members 151 of the electrode structure population comprise an anodically active electroactive material (sometimes referred to as a negative electrode) and members 152 of the counter-electrode structure population comprise a cathodically active electroactive material (sometimes referred to as a positive electrode). In other embodiments, members 151 of the electrode structure population comprise a cathodically active electroactive material and members 152 of the counter-electrode structure population comprise an anodically active electroactive material. In each of the embodiments and examples recited in this paragraph, negative electrode active material may be a particulate agglomerate electrode or a monolithic electrode Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy thereof.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates and combinations thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of the negative electrode active material is at least 0.1. Typically, however, the void volume fraction of the negative electrode active material is not greater than 0.8. For example, in one embodiment, the void volume fraction of the negative electrode active material is about 0.15 to about 0.75. By way of the further example, in one embodiment, the void volume fraction of the negative electrode active material is about 0.2 to about 0.7. By way of the further example, in one embodiment, the void volume fraction of the negative electrode active material is about 0.25 to about 0.6.

Depending upon the composition of the microstructured negative electrode active material and the method of its formation, the microstructured negative electrode active material may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the negative electrode active material; for example, lithium ions may enter the negative electrode active material through the void openings after leaving the positive electrode active material. In another embodiment, the void volume comprises closed voids, that is, the negative electrode active material contains voids that are enclosed by negative electrode active material. In general, open voids can provide greater interfacial surface area for the carrier ions whereas closed voids tend to be less susceptible to solid electrolyte interface while each provides room for expansion of the negative electrode active material upon the entry of carrier ions. In certain embodiments, therefore, it is preferred that the negative electrode active material comprise a combination of open and closed voids.

In one embodiment, negative electrode active material comprises porous aluminum, tin or silicon or an alloy thereof. Porous silicon layers may be formed, for example, by anodization, by etching (e.g., by depositing precious metals such as gold, platinum, silver or gold/palladium on the (100) surface of single crystal silicon and etching the surface with a mixture of hydrofluoric acid and hydrogen peroxide), or by other methods known in the art such as patterned chemical etching. Additionally, the porous negative electrode active material will generally have a porosity fraction of at least about 0.1 but less than 0.8 and have a thickness of about 1 to about 100 micrometers. For example, in one embodiment negative electrode active material comprises porous silicon, has a thickness of about 5 to about 100 micrometers, and has a porosity fraction of about 0.15 to about 0.75. By way of further example, in one embodiment, negative electrode active material comprises porous silicon, has a thickness of about 10 to about 80 micrometers, and has a porosity fraction of about 0.15 to about 0.7. By way of further example, in one such embodiment negative electrode active material comprises porous silicon, has a thickness of about 20 to about 50 micrometers, and has a porosity fraction of about 0.25 to about 0.6. By way of further example, in one embodiment negative electrode active material comprises a porous silicon alloy (such as nickel silicide), has a thickness of about 5 to about 100 micrometers, and has a porosity fraction of about 0.15 to about 0.75.

In another embodiment, negative electrode active material comprises fibers of aluminum, tin or silicon, or an alloy thereof. Individual fibers may have a diameter (thickness dimension) of about 5 nm to about 10,000 nm and a length generally corresponding to the thickness of the negative electrode active material. Fibers (nanowires) of silicon may be formed, for example, by chemical vapor deposition or other techniques known in the art such as vapor liquid solid (VLS) growth and solid liquid solid (SLS) growth. Additionally, the negative electrode active material will generally have a porosity fraction of at least about 0.1 but less than 0.8 and have a thickness of about 1 to about 200 micrometers. For example, in one embodiment negative electrode active material comprises silicon nanowires, has a thickness of about 5 to about 100 micrometers, and has a porosity fraction of about 0.15 to about 0.75. By way of further example, in one embodiment, negative electrode active material comprises silicon nanowires, has a thickness of about 10 to about 80 micrometers, and has a porosity fraction of about 0.15 to about 0.7. By way of further example, in one such embodiment negative electrode active material comprises silicon nanowires, has a thickness of about 20 to about 50 micrometers, and has a porosity fraction of about 0.25 to about 0.6. By way of further example, in one embodiment negative electrode active material comprises nanowires of a silicon alloy (such as nickel silicide), has a thickness of about 5 to about 100 micrometers, and has a porosity fraction of about 0.15 to about 0.75.

In one embodiment, members of the electrode population comprise an electrode active material layer, an electrode current collector and an electrode backbone that supports the electrode active material layer and the electrode current collector. Similarly, in one embodiment, members of the counter-electrode population comprise a counter-electrode active material layer, a counter-electrode current collector and a counter-electrode backbone that supports the counter-electrode active material layer and the counter-electrode current collector.

In one embodiment, each member of the electrode population has a bottom, a top, and a longitudinal axis ($A_E$) extending from the bottom to the top thereof and in a direction generally perpendicular to the direction in which the alternating sequence of electrode structures and counter-electrode structures progresses. Additionally, each member of the electrode population has a length ($L_E$) measured along the longitudinal axis ($A_E$), a width ($W_E$) measured in the direction in which the alternating sequence of electrode structures and counter-electrode structures progresses, and a height ($H_E$) measured in a direction that is perpendicular to each of the directions of measurement of the length ($L_E$) and the width ($W_E$). Each member of the electrode population also has a perimeter ($P_E$) that corresponds to the sum of the length(s) of the side(s) of a projection of the electrode in a plane that is normal to its longitudinal axis.

The length ($L_E$) of the members of the electrode population will vary depending upon the energy storage device and its intended use. In general, however, the members of the electrode population will typically have a length ($L_E$) in the range of about 5 mm to about 500 mm. For example, in one such embodiment, the members of the electrode population have a length ($L_E$) of about 10 mm to about 250 mm. By way of further example, in one such embodiment the members of the electrode population have a length ($L_E$) of about 25 mm to about 100 mm.

The width ($W_E$) of the members of the electrode population will also vary depending upon the energy storage device and its intended use. In general, however, each member of the electrode population will typically have a width ($W_E$) within the range of about 0.01 mm to 2.5 mm. For example, in one embodiment, the width ($W_E$) of each member of the electrode population will be in the range of about 0.025 mm to about 2 mm. By way of further example, in one embodiment, the width ($W_E$) of each member of the electrode population will be in the range of about 0.05 mm to about 1 mm.

The height ($H_E$) of the members of the electrode population will also vary depending upon the energy storage device and its intended use. In general, however, members of the electrode population will typically have a height ($H_E$) within the range of about 0.05 mm to about 10 mm. For example, in one embodiment, the height ($H_E$) of each member of the electrode population will be in the range of about 0.05 mm to about 5 mm. By way of further example, in one embodiment, the height ($H_E$) of each member of the electrode population will be in the range of about 0.1 mm to about 1 mm.

The perimeter ($P_E$) of the members of the electrode population will similarly vary depending upon the energy storage device and its intended use. In general, however, members of the electrode population will typically have a perimeter ($P_E$) within the range of about 0.025 mm to about 25 mm. For example, in one embodiment, the perimeter ($P_E$) of each member of the electrode population will be in the range of about 0.1 mm to about 15 mm. By way of further example, in one embodiment, the perimeter ($P_E$) of each member of the electrode population will be in the range of about 0.5 mm to about 10 mm.

In general, members of the electrode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the electrode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the electrode population.

Additionally, it is generally preferred that members of the electrode population have a length ($L_E$) that is substantially greater than its perimeter ($P_E$); for example, in one embodiment, the ratio of $L_E$ to $P_E$ is at least 1.25:1, respectively, for each member of the electrode population. By way of further example, in one embodiment the ratio of $L_E$ to $P_E$ is at least 2.5:1, respectively, for each member of the electrode population. By way of further example, in one embodiment, the ratio of $L_E$ to $P_E$ is at least 3.75:1, respectively, for each member of the electrode population.

In one embodiment, the ratio of the height ($H_E$) to the width ($W_E$) of the members of the electrode population is at least 0.4:1, respectively. For example, in one embodiment, the ratio of $H_E$ to $W_E$ will be at least 2:1, respectively, for each member of the electrode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the electrode population.

Each member of the counter-electrode population has a bottom, a top, and a longitudinal axis ($A_{CE}$) extending from the bottom to the top thereof and in a direction generally perpendicular to the direction in which the alternating sequence of electrode structures and counter-electrode structures progresses. Additionally, each member of the counter-electrode population has a length ($L_{CE}$) measured along the longitudinal axis ($A_{CE}$), a width ($W_{CE}$) measured in the direction in which the alternating sequence of electrode structures and counter-electrode structures progresses, and a height ($H_{CE}$) measured in a direction that is perpendicular to each of the directions of measurement of the length ($L_{CE}$) and the width ($W_{CE}$). Each member of the counter-electrode population also has a perimeter ($P_{CE}$) that corresponds to the sum of the length(s) of the side(s) of a projection of the counter-electrode in a plane that is normal to its longitudinal axis.

The length ($L_{CE}$) of the members of the counter-electrode population will vary depending upon the energy storage device and its intended use. In general, however, each member of the counter-electrode population will typically have a length ($L_{CE}$) in the range of about 5 mm to about 500 mm. For example, in one such embodiment, each member of the counter-electrode population has a length ($L_{CE}$) of about 10 mm to about 250 mm. By way of further example, in one such embodiment each member of the counter-electrode population has a length ($L_{CE}$) of about 25 mm to about 100 mm.

The width ($W_{CE}$) of the members of the counter-electrode population will also vary depending upon the energy storage device and its intended use. In general, however, members of the counter-electrode population will typically have a width ($W_{CE}$) within the range of about 0.01 mm to 2.5 mm. For example, in one embodiment, the width ($W_{CE}$) of each member of the counter-electrode population will be in the range of about 0.025 mm to about 2 mm. By way of further example, in one embodiment, the width ($W_{CE}$) of each member of the counter-electrode population will be in the range of about 0.05 mm to about 1 mm.

The height ($H_{CE}$) of the members of the counter-electrode population will also vary depending upon the energy storage device and its intended use. In general, however, members of the counter-electrode population will typically have a height ($H_{CE}$) within the range of about 0.05 mm to about 10 mm. For example, in one embodiment, the height ($H_{CE}$) of each member of the counter-electrode population will be in the range of about 0.05 mm to about 5 mm. By way of further example, in one embodiment, the height ($H_{CE}$) of each member of the counter-electrode population will be in the range of about 0.1 mm to about 1 mm.

The perimeter ($P_{CE}$) of the members of the counter-electrode population will also vary depending upon the energy storage device and its intended use. In general, however, members of the counter-electrode population will typically have a perimeter ($P_{CE}$) within the range of about 0.025 mm to about 25 mm. For example, in one embodiment, the perimeter ($P_{CE}$) of each member of the counter-electrode population will be in the range of about 0.1 mm to about 15 mm. By way of further example, in one embodiment, the perimeter ($P_{CE}$) of each member of the counter-electrode population will be in the range of about 0.5 mm to about 10 mm.

In general, each member of the counter-electrode population has a length ($L_{SE}$) that is substantially greater than width ($W_{EE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1 respectively and the ratio of $L_{CE}$ to $H_{CE}$ is at least 5:1, respectively), for each member of the counter-electrode population. By way of further example, in one embodiment the ratio of $L_{CE}$ to each of $W_{CE}$ and $H_{CE}$ is at least 10:1 for each member of the counter-electrode population. By way of further example, in one embodiment, the ratio of $L_{CE}$ to each of $W_{CE}$ and $H_{CE}$ is at least 15:1 for each member of the counter-electrode population. By way of further example, in one embodiment, the ratio of $L_{CE}$ to each of $W_{CE}$ and $H_{CE}$ is at least 20:1 for each member of the counter-electrode population.

Additionally, it is generally preferred that members of the counter-electrode population have a length ($L_{CE}$) that is substantially greater than its perimeter ($P_{CE}$); for example, in one embodiment, the ratio of $L_{CE}$ to $P_{CE}$ is at least 1.25:1, respectively, for each member of the counter-electrode population. By way of further example, in one embodiment the ratio of $L_{CE}$ to $P_{CE}$ is at least 2.5:1, respectively, for each member of the counter-electrode population. By way of further example, in one embodiment, the ratio of $L_{CE}$ to $P_{CE}$ is at least 3.75:1, respectively, for each member of the counter-electrode population.

In one embodiment, the ratio of the height ($H_{CE}$) to the width ($W_{CE}$) of the members of the counter-electrode population is at least 0.4:1, respectively. For example, in one embodiment, the ratio of $H_{CE}$ to $W_{CE}$ will be at least 2:1, respectively, for each member of the counter-electrode population. By way of further example, in one embodiment the ratio of $H_{CE}$ to $W_{CE}$ will be at least 10:1, respectively, for each member of the counter-electrode population. By way of further example, in one embodiment the ratio of $H_{CE}$ to $W_{CE}$ will be at least 20:1, respectively, for each member of the counter-electrode population. Typically, however, the ratio of $H_{CE}$ to $W_{CE}$ will generally be less than 1,000:1, respectively, for each member of the electrode population. For example, in one embodiment the ratio of $H_{CE}$ to $W_{CE}$ will be less than 500:1, respectively, for each member of the counter-electrode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the counter-electrode population.

Referring again to FIG. 12A, electrically insulating separator layer 153 surrounds and electrically isolates each member 151 of the electrode structure population from each member 152 of the counter-electrode structure population. Electrically insulating separator layer 153 will typically comprise a microporous separator material that can be permeated with a non-aqueous electrolyte; for example, in one embodiment the microporous separator material comprises pores having a diameter of at least 50 Å, more typically in the range of about 2,500 Å, and a porosity in the range of about 25% to about 75%, more typically in the range of about 35-55%. Additionally, the microporous separator material is permeated with a non-aqueous electrolyte to permit conduction of carrier ions between adjacent members of the electrode and counter-electrode populations. In one embodiment, for example, and ignoring the porosity of the microporous separator material, at least 70 vol % of electrically insulating separator material layer 153 between a member 151 of the electrode structure population and the nearest member(s) 152 of the counter-electrode structure population (i.e., an "adjacent pair") for ion exchange during charging or discharging is a microporous separator material; stated differently, microporous separator material constitutes at least 70 vol. % of the electrically insulating material between a member 151 of the electrode structure population and the nearest member 152 of the counter-electrode structure population. By way of further example, in one embodiment and ignoring the porosity of the microporous separator material, microporous separator material constitutes at least 75 vol % of the electrically insulating separator material layer between adjacent pairs of members 151 and members 152 of the electrode structure population and the counter-electrode structure population, respectively. By way of further example, in one embodiment and ignoring the porosity of the microporous separator material, the microporous separator material constitutes at least 80 vol % of the electrically insulating separator material layer between adjacent pairs of members 151 and members 152 of the electrode structure population and the counter-electrode structure population, respectively. By way of further example, in one embodiment and ignoring the porosity of the microporous separator material, the microporous separator material constitutes at least 85 vol % of the electrically insulating separator material layer between adjacent pairs of members 151 and members 152 of the electrode structure population and the counter-electrode structure population, respectively. By way of further example, in one embodiment and ignoring the porosity of the microporous separator material, the microporous separator material constitutes at least 90 vol % of the electrically insulating separator material layer between adjacent pairs of members 151 and members 152 of the electrode structure population and the counter-electrode structure population, respectively. By way of further example, in one embodiment and ignoring the porosity of the microporous separator material, the microporous separator material constitutes at least 95 vol % of the electrically insulating separator material layer between adjacent pairs of members 151 and members 152 of the electrode structure population and the counter-electrode structure population, respectively. By way of further example, in one embodiment and ignoring the porosity of the microporous separator material, the microporous separator material constitutes at least 99 vol % of the electrically insulating separator material layer between adjacent pairs of members 151 and members 152 of the electrode structure population and the counter-electrode structure population, respectively.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol. %. In one embodiment, the microporous separator material will have a porosity of about 35-55%.

The binder for the microporous separator material may be selected from a wide range of inorganic or polymeric materials. For example, in one embodiment the binder is an organic material selected from the group consisting of silicates, phosphates, aluminates, aluminosilicates, and hydroxides such as magnesium hydroxide, calcium hydroxide etc. For example, in one embodiment the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment the particulate material has a conductivity for carrier ions (e.g., lithium) of less than $1 \times 10^{-4}$ S/cm. By way of further example in one embodiment the particulate material has a conductivity for carrier ions of less than $1 \times 10^{-5}$ S/cm. By way of further example in one embodiment the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, e.g., P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing etc while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled energy storage device, the microporous separator material is permeated with a non-aqueous electrolyte suitable for use as a secondary battery electrolyte. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Referring again to FIGS. 12A, 12B and 12C, the regions of the longitudinal end surfaces 122, 124 of the electrode assembly that are coincident with the projection of the members of the electrode and counter-electrode populations onto the longitudinal end surfaces 162, 164 (i.e., the "projected surface regions"), respectively, will be under a significant compressive load imposed by constraint 130 (see FIG. 4). For example, in one embodiment the regions of the longitudinal end surfaces of the electrode assembly that are coincident with the projection of the members of the electrode and counter-electrode populations onto the longitudinal end surfaces will each be under a compressive load of at least 0.7 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 1.75 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 2.8 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 3.5 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 5.25 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 7 kPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 8.75 kPa (averaged over the surface area of each of the first and second projected surface regions, respectively). In general, however, the regions of the longitudinal end surfaces of the electrode assembly that are coincident with the projection of the members of the electrode and counter-electrode populations onto the longitudinal end surfaces will each be under a compressive load of no more than about 10 kPa (averaged over the surface area of each of the first and second projected surface regions, respectively). In each of the foregoing exemplary embodiments, the longitudinal end surfaces of a secondary battery of the present disclosure will experience such compressive loads when the battery is charged to at least about 80% of its rated capacity.

In certain embodiments, substantially the entire longitudinal end surfaces of an electrode assembly will be under a significant compressive load (and not necessarily merely the first and second projected surface regions). For example, in some embodiments In general, each of the longitudinal end surfaces of the electrode assembly will be under a compressive load of at least 0.7 kPa (averaged over the total surface area of each of the longitudinal end surfaces, respectively). For example, in one embodiment each of the longitudinal end surfaces of the electrode assembly will be under a compressive load of at least 1.75 kPa (averaged over the total surface area of each of the longitudinal end surfaces, respectively). By way of further example, in one such embodiment each of the longitudinal end surfaces of the electrode assembly will be under a compressive load of at least 2.8 kPa (averaged over the total surface area of each of the longitudinal end surfaces, respectively). By way of further example, in one such embodiment each of the longitudinal end surfaces of the electrode assembly will be under a compressive load of at least 3.5 kPa (averaged over the total surface area of each of the longitudinal end surfaces, respectively). By way of further example, in one such embodiment each of the longitudinal end surfaces of the electrode assembly will be under a compressive load of at least 5.25 kPa (averaged over the total surface area of each of the longitudinal end surfaces, respectively). By way of further example, in one such embodiment each of the longitudinal end surfaces of the electrode assembly will be under a compressive load of at least 7 kPa (averaged over the total surface area of each of the longitudinal end surfaces, respectively). By way of further example, in one such embodiment each of the longitudinal end surfaces of the electrode assembly will be under a compressive load of at least 8.75 kPa (averaged over the total surface area of each of the longitudinal end surfaces, respectively). In general, however, the longitudinal end surfaces of the electrode assembly will be under a compressive load of no more than about 10 kPa (averaged over the total surface area of each of the longitudinal end surfaces, respectively). In each of the foregoing exemplary embodiments, the longitudinal end surfaces of the electrode assembly will experience such compressive loads when the battery is charged to at least about 80% of its rated capacity.

In one embodiment, each of the first and second longitudinal end surfaces of the electrode assembly are under a compressive load of at least 100 psi. For example, in one embodiment, each of the first and second longitudinal end surfaces are under a compressive load of at least 200 psi. By way of further example, in one embodiment each of the first and second longitudinal end surfaces are under a compressive load of at least 300 psi. By way of further example, in one embodiment each of the first and second longitudinal end surfaces are under a compressive load of at least 400 psi. By way of yet a further example, in one embodiment each of the first and second longitudinal end surfaces are under a compressive load of at least 500 psi. By way of further example, in one embodiment each of the first and second longitudinal end surfaces are under a compressive load of at least 600 psi. By way of yet another example, in one embodiment, each of the first and second longitudinal end surfaces are under a compressive load of at least 700 psi. By way of yet another example, in one embodiment, each of the first and second longitudinal end surfaces are under a compressive load of at least 800 psi. By way of further example, in one embodiment each of the first and second longitudinal end surfaces are under a compressive load of at least 900 psi. In yet another example, each of the first and second longitudinal end surfaces are under a compressive load of at least 1000 psi.

Referring again to FIG. 4 and FIGS. 5A, 5B, 5C, and 5D, and in accordance with one aspect of the present disclosure, tension members 133, 135 are preferably relatively close to the lateral surface to inhibit buckling of electrode assembly in response to the compressive force applied to the longitudinal end surfaces. In the embodiment illustrated in FIGS. 5A-5D, for example, tension members 133, 135 contact lateral faces 123, 125, respectively. In other embodiments, however, there may be a gap between the tension members and the lateral surface. In general, however, the distance between the tension members and the lateral surface of the electrode assembly is less than 50% of the smallest Feret diameter of the electrode assembly, with the Feret diameter being measured in the same direction as the distance between the tension members and the lateral surface of the electrode assembly. By way of further example, in one such embodiment the distance between the tension members and the lateral surface of the electrode assembly is less than 40% of the smallest Feret diameter of the electrode assembly, with the Feret diameter being measured in the same direction as the distance between the tension members and the lateral surface of the electrode assembly. By way of further example, in one such embodiment the distance between the tension members and the lateral surface of the electrode assembly is less than 30% of the smallest Feret diameter of the electrode assembly, with the Feret diameter being measured in the same direction as the distance between the tension members and the lateral surface of the electrode assembly. By way of further example, in one such embodiment the distance between the tension members and the lateral surface of the electrode assembly is less than 20% of the smallest Feret diameter of the electrode assembly, with the Feret diameter being measured in the same direction as the distance between the tension members and the lateral surface of the electrode assembly. By way of further example, in one such embodiment the distance between the tension members and the lateral surface of the electrode assembly is less than 10% of the smallest Feret diameter of the electrode assembly, with the Feret diameter being measured in the same direction as the distance between the tension members and the lateral surface of the electrode assembly. By way of further example, in one such embodiment the distance between the tension members and the lateral surface of the electrode assembly is less than 5% of the smallest Feret diameter of the electrode assembly, with the Feret diameter being measured in the same direction as the distance between the tension members and the lateral surface of the electrode assembly.

Referring now to FIG. 7, there can be seen an exploded view of one alternative embodiment of a secondary battery of the present disclosure, generally indicated at 100. The secondary battery includes battery enclosure 102 and a set 110 of electrode assemblies 120 within the battery enclosure 102, each of the electrode assemblies having a first longitudinal end surface 122, an opposing second longitudinal end surface 124 (separated from first longitudinal end surface 122 along a longitudinal axis (not shown) that parallels the "Y-axis" of the imaginary Cartesian coordinate system of FIG. 7), and a lateral surface comprising lateral faces 123, 125, 126, 127 (see, FIG. 4). In contrast to the embodiment illustrated in FIG. 4, in this embodiment an individual constraint 130 imposes a compressive force on the first and second longitudinal surfaces of each of the electrode assemblies of set 110. As previously described, the combined surface area of the opposing first and second longitudinal end surfaces of each electrode assembly within set 110 is less than 50% of the total surface area of each of the electrode assemblies, respectively, within the set. The tension members of the constraint 130 tend to pull the compression members toward each other and thereby apply a compressive force to each of the opposing first and second longitudinal end surfaces of each electrode assembly within set 110, which, in turn, inhibits expansion of each electrode assembly within set 110 in the longitudinal direction (which coincides with the electrode stacking direction of each electrode assembly as previously described herein). In addition, and after battery formation the constraint exerts a pressure on each electrode assembly within set 110 in the longitudinal direction (i.e., electrode stacking direction) that exceeds the pressure maintained on each respective electrode assembly in either of the two directions that are mutually perpendicular to each other and are perpendicular to the longitudinal direction.

Referring now to FIGS. 8, 9, 10A and 10B, in one alternative embodiment constraint 130 is formed from a sheet 107 containing slots 109, connecting regions 111, and fold regions 113. To form the constraint, sheet 107 is simply wrapped around electrode structure 120 (illustrated in FIG. 9 without electrode structure 120), folded along fold regions 113, and overlapping edges 115, 117 are welded, glued or otherwise secured to each other to form a constraint comprising compression members 132, 134 (compression member 134 comprising overlapping edges 115, 177 once secured to each other) and tension members 133, 135. In one such embodiment, constraint 130 is stretched in stacking direction D to place connecting regions 111 under tension which, in turn, causes a compressive force to be applied to the longitudinal end surfaces 122, 124. In an alternative embodiment, instead of stretching the connecting regions 111 to place them in tension, the connecting regions are pre-tensioned prior to installation over the electrode assembly. In another alternative embodiment, the connecting regions 111 are not initially under tension at the time of installation over the electrode assembly, but rather, formation of the battery causes the electrode assembly to expand and induce tension in the connecting tension members (i.e., self-tensioning).

Figure 11A:
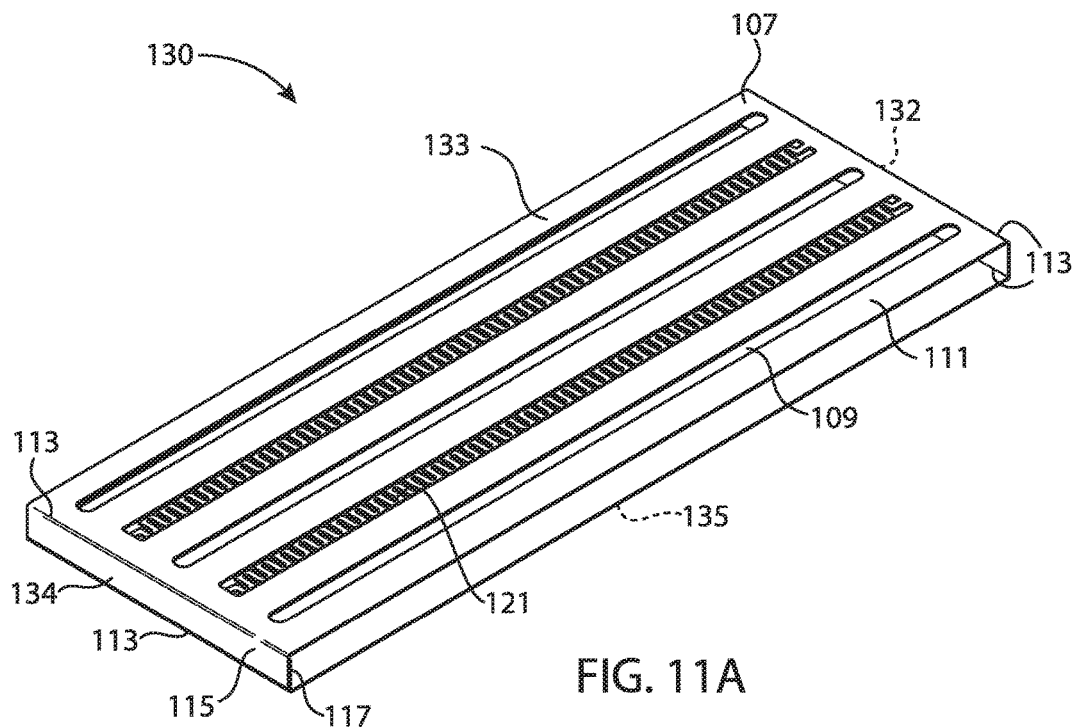
FIG. 11A is a schematic diagram of an alternative embodiment of a constraint for an electrode assembly of a secondary battery of the present disclosure.
Figure 11B:
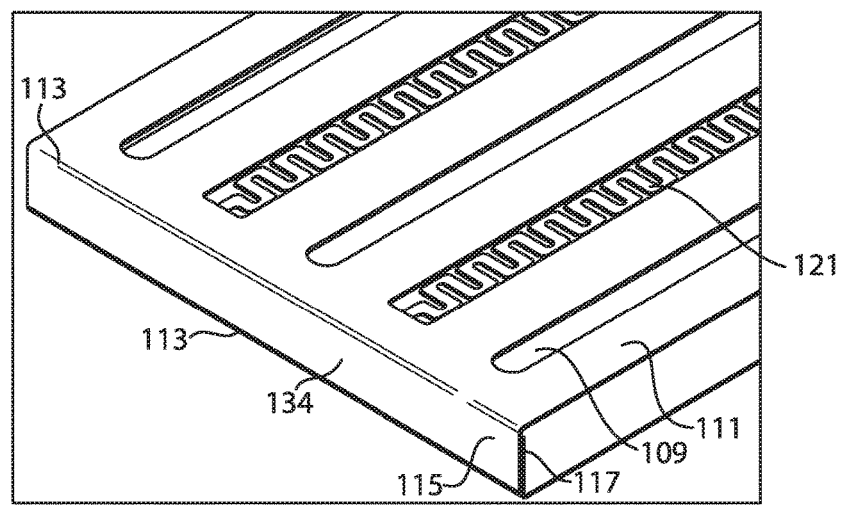
FIG. 11B is an enlarged view of the constraint of FIG. 11A.

Referring now to FIGS. 11A and 11B, in one alternative embodiment constraint 130 comprises one or more serpentine tension members 121 in addition to slots 109 and connecting regions 111. Serpentine tension members 121 provide a secondary tensioning force in those embodiments in which the forces are greater during formation than during cycling. In such embodiments, the straight members provide a greater resistance and yield during formation whereas the serpentine tension members apply a lesser tension force during cycling. As previously described, constraint 130 may be formed by wrapping sheet 107 around electrode structure 120, folding it along fold regions 113, and securing overlapping edges 115, 117 (illustrated in FIGS. 11A and 11B without electrode structure 20). As sheet 107 is wrapped around the electrode structure, constraint 130 is stretched in stacking direction D to place connecting regions 111 and serpentine tension members 121 under tension which, in turn, exerts a compressive force on the electrode structure 120 in stacking direction D.

In general, a constraint having high strength and stiffness can inhibit rapid growth of the electrode assembly during formation of the battery whereas a constraint with much lower strength and stiffness permits changes in electrode assembly volume due to the variation in lithiation encountered at different charge states. In addition, a constraint with lower stiffness and high preload (or starting load) is helps control cell impedance by maintaining a minimum force between cathode and anode. One approach to address these competing requirements in accordance with one embodiment of the present disclosure is to construct a constraint from two components. These components can be made of either (i) similar materials with different geometries or (ii) materials with different elastic modulus and the same geometry, (iii) some combination of elastic modulus and geometry properties to achieve the desired stiffness. In both cases, the first component ("Element 1") utilizes a higher stiffness design (material or geometry driven) than the second component ("Element 2"), and elastically and then plastically deforms, but does not fracture under the loads it experiences during battery formation. Element 2 would preferably only deform elastically. In both cases, the first element should prevent the second element from displacing more than it does itself either by encapsulating the second element or otherwise supporting it.

In one embodiment, the constraint comprises an elastically deformable material located between the longitudinal surface(s) of the electrode assembly and the compression member. In this embodiment, the elastically deformable material elastically deforms to accommodate expansion of the electrodes and elastically returns to its original thickness and shape as the electrodes contract. As a result by a minimum force may be maintained on the electrode assembly in the longitudinal direction as the electrodes and/or counter-electrodes expand and contract during cycling of the secondary battery.

Figure 16:
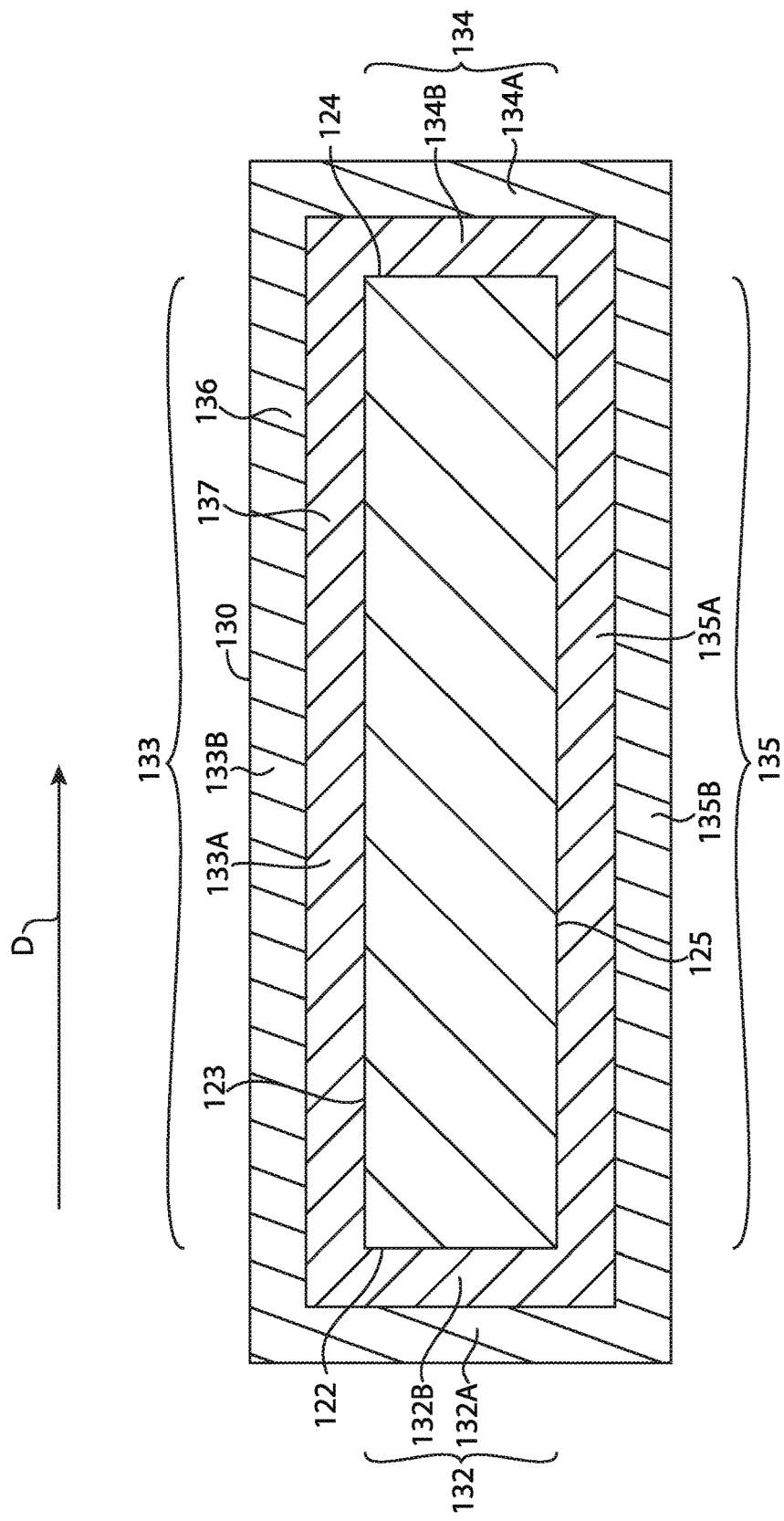
FIG. 16 is a cross-sectional view of one alternative embodiment of the constraint and electrode assembly of the present disclosure.

Referring now to FIG. 16, in one exemplary embodiment, constraint 130 comprises first and second elements 136, 137. In this embodiment, compression member 132 comprises compression regions 132A, 132B of first and second elements 136, 137, respectively, which overlie longitudinal end surface 122 and compression member 134 comprises compression regions 134A and 134B of first and second elements 136, 137, respectively, which overlie longitudinal end surface 124. Additionally, tension member 133 comprises tension member regions 133A, 133B of first and second elements 136, 137, respectively, which overlie lateral face 123 and tension member 135 comprises tension member regions 135A and 135B of first and second elements 136, 137, respectively, which lateral face 125. In this exemplary embodiment, first element 136 is used to limit maximum growth of the electrode assembly during cell formation or cell cycling whereas element 137 is used to maintain preload in the direction of electrode stacking direction D during a discharged state. In this exemplary embodiment, element 136 has no preload (exerts no force on the electrode assembly) prior to formation. Element 137 is preloaded against the electrode assembly to impose a compressive force on first and second longitudinal end surfaces 122, 124. As the electrode assembly expands (e.g., as a silicon-containing anode expands upon incorporation of carrier ions during a charging step), the force on element 136 grows rapidly due to its high stiffness, while force on the lower stiffness element 137 rises slowly since its displacement is limited by element 136. Above a certain force, element 136 will yield or move from elastic to plastic (permanent) deformation while element 137 remains in the elastic range. As forces continue to rise, element 136 increases in length permanently. Thereafter, when the forces decrease to a lesser value (e.g., as a silicon-containing anode contracts upon deinsertion of carrier ions during a discharging step), element 136 has been permanently deformed and may no longer contact the electrode assembly 120 and element 137 may return to near its initial preload level.

Figure 13:
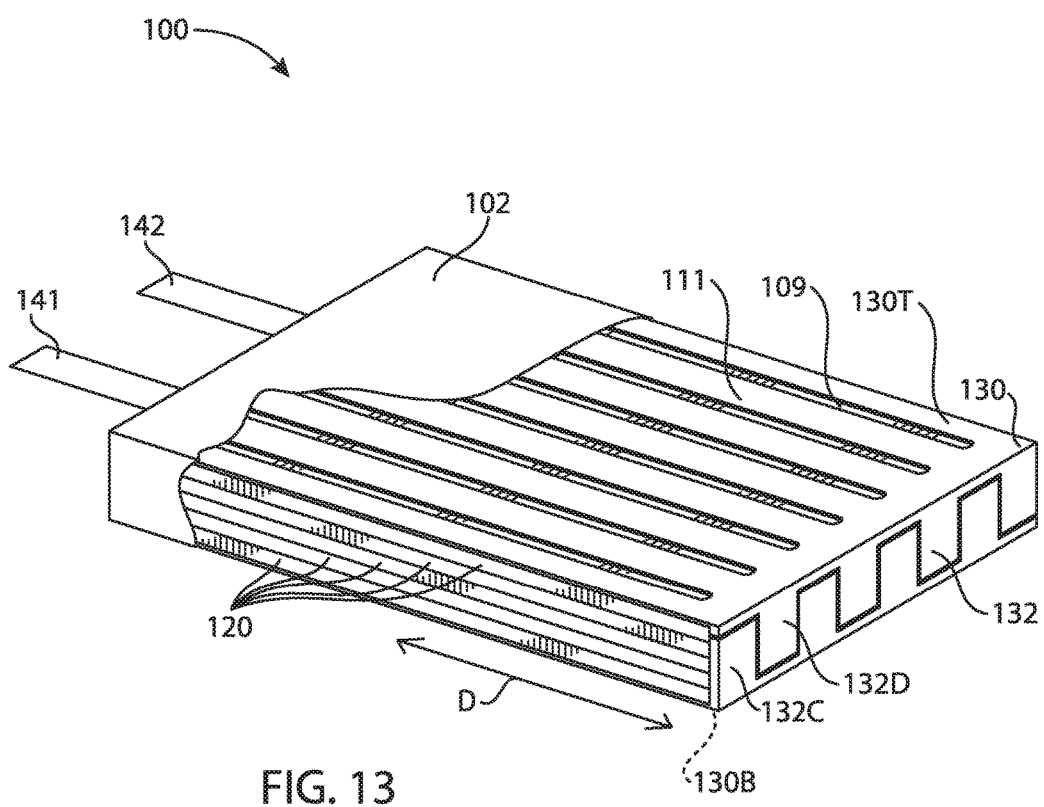
FIG. 13 is a perspective view of one alternative embodiment of a secondary battery of the present disclosure with parts broken away to show internal construction.

Referring now to FIG. 13, in one alternative embodiment secondary battery 100 comprises battery enclosure 102, and a set of electrode assemblies 120 within the battery enclosure 102. As previously described, each of the electrode assemblies has a first longitudinal end surface and an opposing second longitudinal end surface separated along a longitudinal axis, and a lateral surface surrounding the longitudinal axis (see FIGS. 4 and 12A). Additionally, the set has an associated constraint 130 comprising top constraint member 130T and bottom constraint member 130B to inhibit expansion in the electrode stacking direction D of each of the electrode assemblies within the set. Top constraint member 130T and bottom constraint member 130B comprise interlocking tabs 132D, 132C, respectively, which in combination constitute compression member 132. Top constraint member 130T and bottom constraint member 130B comprise interlocking tabs, respectively, which in combination constitute compression member 134 (not shown). As in other embodiments, each of the compression members apply a compressive force to the opposing first and second longitudinal end surfaces and the tension members comprise slots 109 and connecting regions 111 as previously described.

Figure 14:
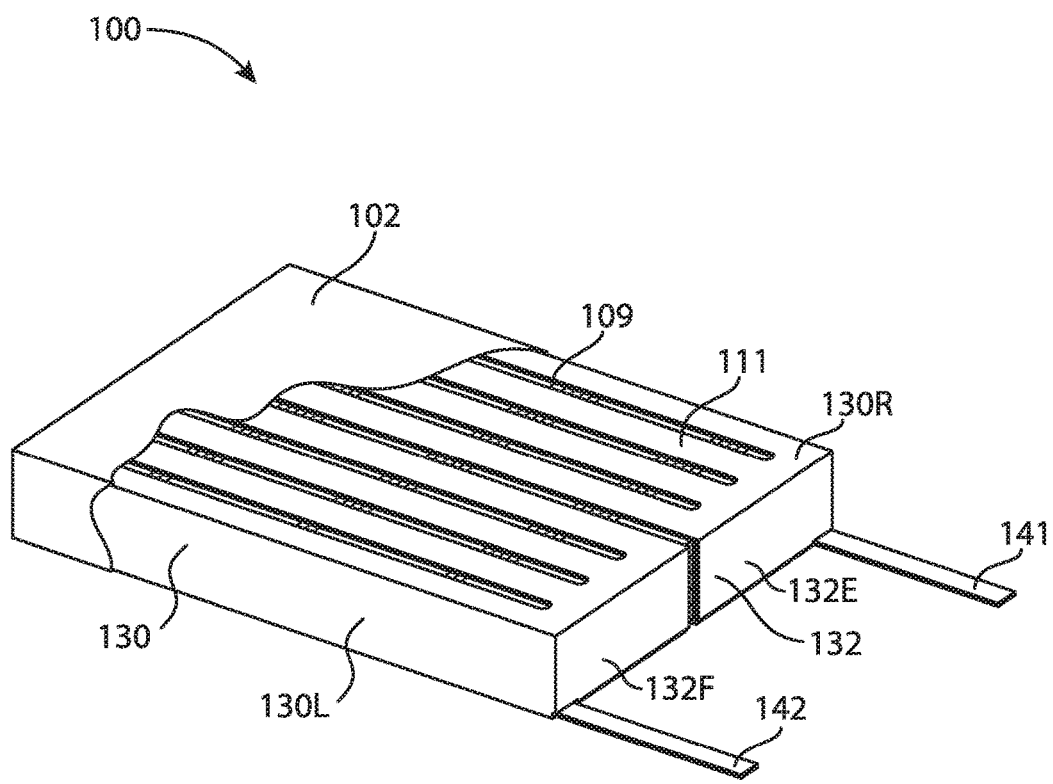
FIG. 14 is a perspective view of one alternative embodiment of a secondary battery of the present disclosure with parts broken away to show internal construction.

Referring now to FIG. 14, in one alternative embodiment secondary battery 100 comprises battery enclosure 102, a set of electrode assemblies (not shown) within the battery enclosure 102, and an associated constraint 130 to inhibit expansion of each of the electrode assemblies within the set in the electrode stacking direction. Constraint 130 comprises first and second shells 130R, 130L that respectively envelope first and second longitudinal halves, respectively, of the set of electrode assemblies. As in other embodiments, a first compression member 132 comprising elements 132E and 132F overlies the first longitudinal end surfaces (not shown) of the electrode assemblies within the set, a second compression member (not shown) overlies the second longitudinal end surfaces (not shown) of the electrode assemblies within the set, and tension members which overlie the lateral surface of the electrode assemblies. As in other embodiments, each of the compression members apply a compressive force to the opposing first and second longitudinal end surfaces and the tension members comprise slots 109 and connecting regions 111 as previously described.

Figure 15:
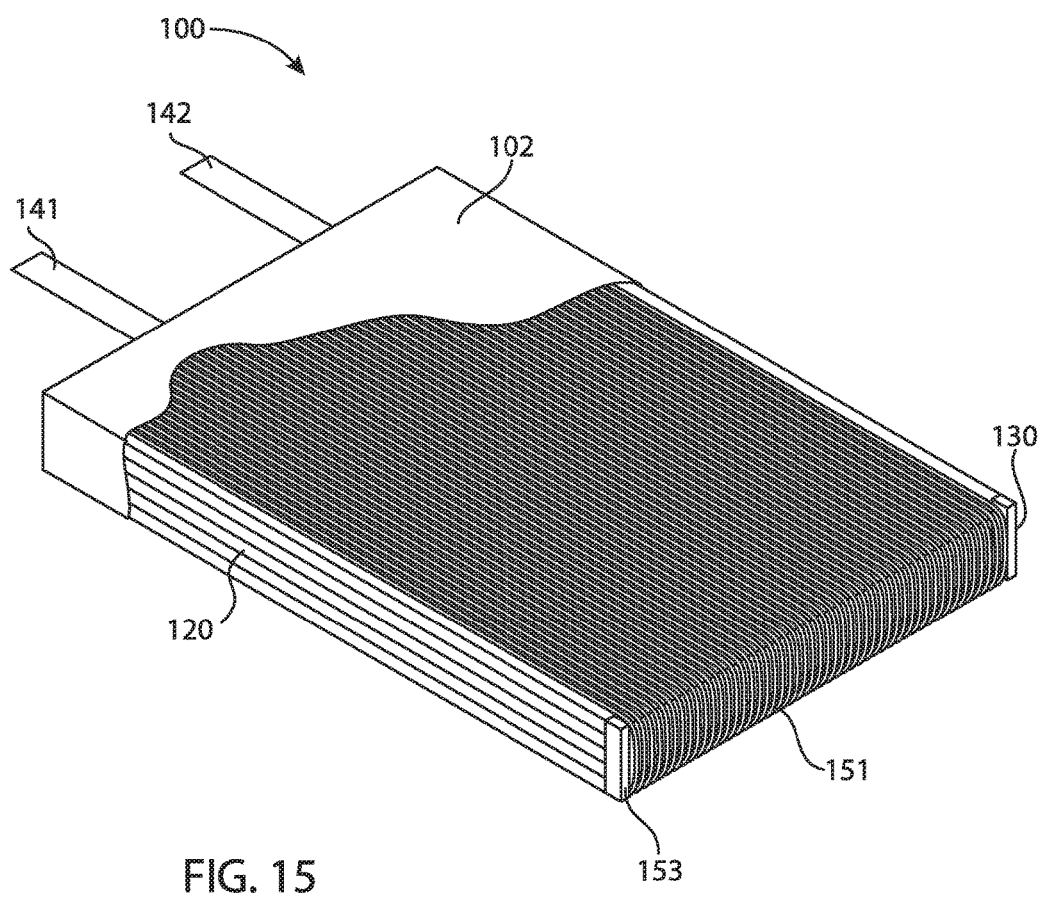
FIG. 15 is a perspective view of one alternative embodiment of a secondary battery of the present disclosure with parts broken away to show internal construction.

Referring now to FIG. 15, in one alternative embodiment secondary battery 100 comprises battery enclosure 102, a set of electrode assemblies 120 within the battery enclosure 102, and an associated constraint 130 to inhibit expansion of each of the electrode assemblies within the set in the electrode stacking direction. Constraint 130 comprises a series of bands 151 that encircle each of the electrode assemblies and a cap 153 interposed between bands 151 and the first and second longitudinal end surfaces (not shown) of each electrode assembly 120 within the set. In this embodiment, the portion of the bands overlying the longitudinal end surfaces and the caps constitute a compression member of the present disclosure, and the portion of the bands overlying the lateral surface of the electrode assemblies constitute the tension members. As in other embodiments, each of the compression members apply a compressive force to the opposing first and second longitudinal end surfaces as previously described.

In further embodiments, numbered 1-122 below, aspects of the present disclosure include:

Embodiment 1

A secondary battery for cycling between a charged state and a discharged state, the secondary battery comprising a battery enclosure, an electrode assembly and a non-aqueous liquid electrolyte within the battery enclosure, and a constraint that maintains a pressure on the electrode assembly as the secondary battery is cycled between the charged and the discharged states, the electrode assembly comprising a population of electrode structures, a population of counter-electrode structures and an electrically insulating microporous separator material between members of the electrode and counter-electrode populations wherein the electrode assembly has opposing first and second longitudinal end surfaces separated along a longitudinal axis, and a lateral surface surrounding the longitudinal axis and connecting the first and second longitudinal end surfaces, the surface area of the first and second longitudinal end surfaces being less than 33% of the surface area of the electrode assembly, members of the electrode population and members of the counter-electrode population are arranged in an alternating sequence in a stacking direction that parallels the longitudinal axis within the electrode assembly, a projection of the members of the electrode population and the counter-electrode populations onto the first longitudinal surface circumscribes a first projected area and a projection of the members of the electrode population and the counter-electrode populations onto the second longitudinal surface circumscribes a second projected area, the constraint comprises first and second compression members that overlie the first and second projected areas, respectively, the compression members being connected by tension members that overlie the lateral surface of the electrode assembly and pull the compression members toward each other, and the constraint maintains a pressure on the electrode assembly in the stacking direction that exceeds the pressure maintained on the electrode assembly in each of two directions that are mutually perpendicular and perpendicular to the stacking direction.

Embodiment 2

The secondary battery of Embodiment 1 wherein the constraint imposes an average compressive force to each of the first and second projected areas of at least 0.7 kPa, averaged over the surface area of the first and second projected areas, respectively.

Embodiment 3

The secondary battery of Embodiment 1 wherein the constraint imposes an average compressive force to each of the first and second projected areas of at least 1.75 kPa, averaged over the surface area of the first and second projected areas, respectively.

Embodiment 4

The secondary battery of Embodiment 1 wherein the constraint imposes an average compressive force to each of the first and second projected areas of at least 2.8 kPa, averaged over the surface area of the first and second projected areas, respectively.

Embodiment 5

The secondary battery of Embodiment 1 wherein the constraint imposes an average compressive force to each of the first and second projected areas of at least 3.5 kPa, averaged over the surface area of the first and second projected areas, respectively.

Embodiment 6

The secondary battery of Embodiment 1 wherein the constraint imposes an average compressive force to each of the first and second projected areas of at least 5.25 kPa, averaged over the surface area of the first and second projected areas, respectively.

Embodiment 7

The secondary battery of Embodiment 1 wherein the constraint imposes an average compressive force to each of the first and second projected areas of at least 7 kPa, averaged over the surface area of the first and second projected areas, respectively.

Embodiment 8

The secondary battery of Embodiment 1 wherein the constraint imposes an average compressive force to each of the first and second projected areas of at least 8.75 kPa, averaged over the surface area of the first and second projected areas, respectively.

Embodiment 9

The secondary battery of Embodiment 1 wherein the constraint imposes an average compressive force to each of the first and second projected areas of at least 10 kPa, averaged over the surface area of the first and second projected areas, respectively.

Embodiment 10

The secondary battery of any preceding Embodiment wherein the surface area of the first and second longitudinal end surfaces is less than 25% of the surface area of the electrode assembly.

Embodiment 11

The secondary battery of any preceding Embodiment wherein the surface area of the first and second longitudinal end surfaces is less than 20% of the surface area of the electrode assembly.

Embodiment 12

The secondary battery of any preceding Embodiment wherein the surface area of the first and second longitudinal end surfaces is less than 15% of the surface area of the electrode assembly.

Embodiment 13

The secondary battery of any preceding Embodiment wherein the surface area of the first and second longitudinal end surfaces is less than 10% of the surface area of the electrode assembly.

Embodiment 14

The secondary battery of any preceding Embodiment wherein the constraint and enclosure have a combined volume that is less than 60% of the volume enclosed by the battery enclosure.

Embodiment 15

The secondary battery of any preceding Embodiment wherein the constraint and enclosure have a combined volume that is less than 45% of the volume enclosed by the battery enclosure.

Embodiment 16

The secondary battery of any preceding Embodiment wherein the constraint and enclosure have a combined volume that is less than 30% of the volume enclosed by the battery enclosure.

Embodiment 17

The secondary battery of any preceding Embodiment wherein the constraint and enclosure have a combined volume that is less than 20% of the volume enclosed by the battery enclosure.

Embodiment 18

The secondary battery of any preceding Embodiment wherein each member of the electrode population has a bottom, a top, a length $L_E$, a width $W_E$, a height $H_E$, and a central longitudinal axis $A_E$ extending from the bottom to the top of each such member and in a direction that is generally transverse to the stacking direction, the length $L_E$ of each member of the electrode population being measured in the direction of its central longitudinal axis $A_E$, the width $W_E$ of each member of the electrode population being measured in the stacking direction, and the height $H_E$ of each member of the electrode population being measured in a direction that is perpendicular to the central longitudinal axis $A_E$ of each such member and to the stacking direction, the ratio of $L_E$ to each of $W_E$ and $H_E$ of each member of the electrode population being at least 5:1, respectively, the ratio of $H_E$ to $W_E$ for each member of the electrode population being between 0.4:1 and 1000:1, respectively.

Embodiment 19

The secondary battery of any preceding Embodiment wherein the microporous separator material comprises a particulate material and a binder, has a void fraction of at least 20 vol. %, and is permeated by the non-aqueous liquid electrolyte.

Embodiment 20

The secondary battery of any preceding Embodiment wherein the tension members are sufficiently proximate the lateral surface to inhibit buckling of the electrode assembly as the secondary battery is cycled between charged and discharged states.

Embodiment 21

The secondary battery of any preceding Embodiment wherein the distance between the tension members and the lateral is less than 50% of the smallest Feret diameter of the electrode assembly, with the Feret diameter being measured in the same direction as the distance between the tension members and the lateral surface of the electrode assembly.

Embodiment 22

The secondary battery of any preceding Embodiment wherein the distance between the tension members and the lateral is less than 40% of the smallest Feret diameter of the electrode assembly, with the Feret diameter being measured in the same direction as the distance between the tension members and the lateral surface of the electrode assembly.

Embodiment 23

The secondary battery of any preceding Embodiment wherein the distance between the tension members and the lateral is less than 30% of the smallest Feret diameter of the electrode assembly, with the Feret diameter being measured in the same direction as the distance between the tension members and the lateral surface of the electrode assembly.

Embodiment 24

The secondary battery of any preceding Embodiment wherein the distance between the tension members and the lateral is less than 20% of the smallest Feret diameter of the electrode assembly, with the Feret diameter being measured in the same direction as the distance between the tension members and the lateral surface of the electrode assembly.

Embodiment 25

The secondary battery of any preceding Embodiment wherein the distance between the tension members and the lateral is less than 10% of the smallest Feret diameter of the electrode assembly, with the Feret diameter being measured in the same direction as the distance between the tension members and the lateral surface of the electrode assembly.

Embodiment 26

The secondary battery of any preceding Embodiment wherein the distance between the tension members and the lateral is less than 5% of the smallest Feret diameter of the electrode assembly, with the Feret diameter being measured in the same direction as the distance between the tension members and the lateral surface of the electrode assembly.

Embodiment 27

The secondary battery of any preceding Embodiment wherein each of the first and second longitudinal end surfaces are under a compressive load of at least 100 psi.

Embodiment 28

The secondary battery of any preceding Embodiment wherein each of the first and second longitudinal end surfaces are under a compressive load of at least 200 psi.

Embodiment 29

The secondary battery of any preceding Embodiment wherein each of the first and second longitudinal end surfaces are under a compressive load of at least 300 psi.

Embodiment 30

The secondary battery of any preceding Embodiment wherein each of the first and second longitudinal end surfaces are under a compressive load of at least 400 psi.

Embodiment 31

The secondary battery of any preceding Embodiment wherein each of the first and second longitudinal end surfaces are under a compressive load of at least 500 psi.

Embodiment 32

The secondary battery of any preceding Embodiment wherein each of the first and second longitudinal end surfaces are under a compressive load of at least 600 psi.

Embodiment 33

The secondary battery of any preceding Embodiment wherein each of the first and second longitudinal end surfaces are under a compressive load of at least 700 psi.

Embodiment 34

The secondary battery of any preceding Embodiment wherein each of the first and second longitudinal end surfaces are under a compressive load of at least 800 psi.

Embodiment 35

The secondary battery of any preceding Embodiment wherein each of the first and second longitudinal end surfaces are under a compressive load of at least 900 psi.

Embodiment 36

The secondary battery of any preceding Embodiment wherein each of the first and second longitudinal end surfaces are under a compressive load of at least 1000 psi.

Embodiment 37

The secondary battery of any preceding Embodiment wherein the secondary battery has a rated capacity and the first and second longitudinal end surfaces are under such compressive load when the secondary battery is charged to at least 80% of its rated capacity.

Embodiment 38

The secondary battery of any preceding Embodiment wherein the electrode structures comprise an anodically active electroactive material and the counter-electrode structures comprise a cathodically active electroactive material.

Embodiment 39

The secondary battery of any preceding Embodiment wherein the electrode structures comprise an anodically active electroactive material comprising silicon and the counter-electrode structures comprise a cathodically active electroactive material.

Embodiment 40

The secondary battery of any preceding Embodiment wherein the secondary battery comprises a set of electrode assemblies, the set comprising at least two electrode assemblies.

Embodiment 41

The secondary battery of Embodiments 1-39 wherein the secondary battery comprises a set of at least two electrode assemblies and the constraint maintains a pressure on the electrode assemblies within the set as the secondary battery is cycled between the charged and the discharged states.

Embodiment 42

The secondary battery of Embodiments 1-39 wherein the secondary battery comprises a set of at least two electrode assemblies and the secondary battery comprises a corresponding number of constraints wherein each of the constraints maintains a pressure on one of the electrode assemblies within the set as the secondary battery is cycled between the charged and the discharged states.

Embodiment 43

The secondary battery of any preceding Embodiment wherein the electrode assembly comprises at least 5 electrode structures and at least 5 counter-electrode structures.

Embodiment 44

The secondary battery of any preceding Embodiment wherein the electrode assembly comprises at least 10 electrode structures and at least 10 counter-electrode structures.

Embodiment 45

The secondary battery of any preceding Embodiment wherein the electrode assembly comprises at least 50 electrode structures and at least 50 counter-electrode structures.

Embodiment 46

The secondary battery of any preceding Embodiment wherein the electrode assembly comprises at least 100 electrode structures and at least 100 counter-electrode structures.

Embodiment 47

The secondary battery of any preceding Embodiment wherein the electrode assembly comprises at least 500 electrode structures and at least 500 counter-electrode structures.

Embodiment 48

The secondary battery of any preceding Embodiment wherein the constraint comprises a material having an ultimate tensile strength of at least 10,000 psi (>70 MPa).

Embodiment 49

The secondary battery of any preceding Embodiment wherein the constraint comprises a material that is compatible with the battery electrolyte.

Embodiment 50

The secondary battery of any preceding Embodiment wherein the constraint comprises a material that does not significantly corrode at the floating or anode potential for the battery.

Embodiment 51

The secondary battery of any preceding Embodiment wherein the constraint comprises a material that does not significantly react or lose mechanical strength at 45° C.

Embodiment 52

The secondary battery of any preceding Embodiment wherein the constraint comprises metal, metal alloy, ceramic, glass, plastic, or a combination thereof.

Embodiment 53

The secondary battery of any preceding Embodiment wherein the constraint comprises a sheet of material having a thickness in the range of about 10 to about 100 micrometers.

Embodiment 54

The secondary battery of any preceding Embodiment wherein the constraint comprises a sheet of material having a thickness in the range of about 30 to about 75 micrometers.

Embodiment 55

The secondary battery of any preceding Embodiment wherein the constraint comprises carbon fibers at >50% packing density.

Embodiment 56

The secondary battery of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 3.

Embodiment 57

The secondary battery of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 3.

Embodiment 58

The secondary battery of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 4.

Embodiment 59

The secondary battery of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 5.

Embodiment 60

An energy storage device for cycling between a charged state and a discharged state, the energy storage device comprising an enclosure, an electrode assembly and a non-aqueous liquid electrolyte within the enclosure, and a constraint that maintains a pressure on the electrode assembly as the energy storage device is cycled between the charged and the discharged states, the electrode assembly comprising a population of electrode structures, a population of counter-electrode structures and an electrically insulating microporous separator material between members of the electrode and counter-electrode populations wherein the electrode assembly has opposing first and second longitudinal end surfaces separated along a longitudinal axis, and a lateral surface surrounding the longitudinal axis and connecting the first and second longitudinal end surfaces, a combined surface area of the first and second longitudinal end surfaces being less than 33% of a combined surface area of the lateral surface and the first and second longitudinal end surfaces, members of the electrode population and members of the counter-electrode population are arranged in an alternating sequence in a stacking direction that parallels the longitudinal axis within the electrode assembly, the constraint comprises first and second compression members connected by at least one tension member that pulls the compression members toward each other, and the constraint maintains a pressure on the electrode assembly in the stacking direction that exceeds the pressure maintained on the electrode assembly in each of two directions that are mutually perpendicular and perpendicular to the stacking direction.

Embodiment 61

The energy storage device of Embodiment 60, wherein the energy storage device is a secondary battery.

Embodiment 62

The energy storage device of Embodiment 60, wherein the constraint comprises first and second compression members that overly the longitudinal end surfaces of the electrode assembly.

Embodiment 63

The energy storage device of any preceding Embodiment, wherein the constraint comprises at least one compression member that is internal to the longitudinal end surfaces.

Embodiment 64

The energy storage device of any preceding Embodiment, wherein a projection of the members of the electrode population and the counter-electrode populations onto the first longitudinal surface circumscribes a first projected area and a projection of the members of the electrode population and the counter-electrode populations onto the second longitudinal surface circumscribes a second projected area, and wherein the first and second projected areas each comprise at least 50% of the surface area of the first and second longitudinal end surfaces, respectively.

Embodiment 65

The energy storage device of any preceding Embodiment, wherein a projection of the members of the electrode population and the counter-electrode populations onto the first longitudinal surface circumscribes a first projected area and a projection of the members of the electrode population and the counter-electrode populations onto the second longitudinal surface circumscribes a second projected area, and wherein the constraint imposes an average compressive force to each of the first and second projected areas of at least 0.7 kPa, averaged over the surface area of the first and second projected areas, respectively.

Embodiment 66

The energy storage device of any preceding Embodiment wherein the constraint imposes an average compressive force to each of the first and second projected areas of at least 1.75 kPa, averaged over the surface area of the first and second projected areas, respectively.

Embodiment 67

The energy storage device of any preceding Embodiment wherein the constraint imposes an average compressive force to each of the first and second projected areas of at least 2.8 kPa, averaged over the surface area of the first and second projected areas, respectively.

Embodiment 68

The energy storage device of any preceding Embodiment wherein the constraint imposes an average compressive force to each of the first and second projected areas of at least 3.5 kPa, averaged over the surface area of the first and second projected areas, respectively.

Embodiment 69

The energy storage device of any preceding Embodiment wherein the constraint imposes an average compressive force to each of the first and second projected areas of at least 5.25 kPa, averaged over the surface area of the first and second projected areas, respectively.

Embodiment 70

The energy storage device of any preceding Embodiment wherein the constraint imposes an average compressive force to each of the first and second projected areas of at least 7 kPa, averaged over the surface area of the first and second projected areas, respectively.

Embodiment 71

The energy storage device of any preceding Embodiment wherein constraint imposes an average compressive force to each of the first and second projected areas of at least 8.75 kPa, averaged over the surface area of the first and second projected areas, respectively.

Embodiment 72

The energy storage device of any preceding Embodiment wherein the constraint imposes an average compressive force to each of the first and second projected areas of at least 10 kPa, averaged over the surface area of the first and second projected areas, respectively.

Embodiment 73

The energy storage device of any preceding Embodiment wherein the combined surface area of the first and second longitudinal end surfaces is less than 25% of the surface area of the electrode assembly.

Embodiment 74

The energy storage device of any preceding Embodiment wherein the combined surface area of the first and second longitudinal end surfaces is less than 20% of the surface area of the electrode assembly.

Embodiment 75

The energy storage device of any preceding Embodiment wherein the combined surface area of the first and second longitudinal end surfaces is less than 15% of the surface area of the electrode assembly.

Embodiment 76

The energy storage device of any preceding Embodiment wherein the combined surface area of the first and second longitudinal end surfaces is less than 10% of the surface area of the electrode assembly.

Embodiment 77

The energy storage device of any preceding Embodiment wherein the constraint and enclosure have a combined volume that is less than 60% of the volume enclosed by the enclosure.

Embodiment 78

The energy storage device of any preceding Embodiment wherein the constraint and enclosure have a combined volume that is less than 45% of the volume enclosed by the enclosure.

Embodiment 79

The energy storage device of any preceding Embodiment wherein the constraint and enclosure have a combined volume that is less than 30% of the volume enclosed by the enclosure.

Embodiment 80

The energy storage device of any preceding Embodiment wherein the constraint and enclosure have a combined volume that is less than 20% of the volume enclosed by the enclosure.

Embodiment 81

The energy storage device of any preceding Embodiment wherein each member of the electrode population has a bottom, a top, a length $L_E$, a width $W_E$, a height $H_E$, and a central longitudinal axis $A_E$ extending from the bottom to the top of each such member and in a direction that is generally transverse to the stacking direction, the length $L_E$ of each member of the electrode population being measured in the direction of its central longitudinal axis $A_E$, the width $W_E$ of each member of the electrode population being measured in the stacking direction, and the height $H_E$ of each member of the electrode population being measured in a direction that is perpendicular to the central longitudinal axis $A_E$ of each such member and to the stacking direction, the ratio of $L_E$ to each of $W_E$ and $H_E$ of each member of the electrode population being at least 5:1, respectively, the ratio of $H_E$ to $W_E$ for each member of the electrode population being between 0.4:1 and 1000:1, respectively.

Embodiment 82

The energy storage device of any preceding Embodiment wherein the microporous separator material comprises a particulate material and a binder, has a void fraction of at least 20 vol. %, and is permeated by the non-aqueous liquid electrolyte.

Embodiment 83

The energy storage device of any preceding Embodiment wherein the tension members are sufficiently proximate the lateral surface to inhibit buckling of the electrode assembly as the energy storage device is cycled between charged and discharged states.

Embodiment 84

The energy storage device of any preceding Embodiment wherein the distance between the tension members and the lateral is less than 50% of the smallest Feret diameter of the electrode assembly.

Embodiment 85

The energy storage device of any preceding Embodiment wherein the distance between the tension members and the lateral is less than 40% of the smallest Feret diameter of the electrode assembly.

Embodiment 86

The energy storage device of any preceding Embodiment wherein the distance between the tension members and the lateral is less than 30% of the smallest Feret diameter of the electrode assembly.

Embodiment 87

The energy storage device of any preceding Embodiment wherein the distance between the tension members and the lateral is less than 20% of the smallest Feret diameter of the electrode assembly.

Embodiment 88

The energy storage device of any preceding Embodiment wherein the distance between the tension members and the lateral is less than 10% of the smallest Feret diameter of the electrode assembly.

Embodiment 89

The energy storage device of any preceding Embodiment wherein the distance between the tension members and the lateral is less than 5% of the smallest Feret diameter of the electrode assembly.

Embodiment 90

The energy storage device of any preceding Embodiment wherein each of the first and second longitudinal end surfaces are under a compressive load of at least 100 psi.

Embodiment 91

The energy storage device of any preceding Embodiment wherein each of the first and second longitudinal end surfaces are under a compressive load of at least 200 psi.

Embodiment 92

The energy storage device of any preceding Embodiment wherein each of the first and second longitudinal end surfaces are under a compressive load of at least 300 psi.

Embodiment 93

The energy storage device of any preceding Embodiment wherein each of the first and second longitudinal end surfaces are under a compressive load of at least 400 psi.

Embodiment 94

The energy storage device of any preceding Embodiment wherein each of the first and second longitudinal end surfaces are under a compressive load of at least 500 psi.

Embodiment 95

The energy storage device of any preceding Embodiment wherein each of the first and second longitudinal end surfaces are under a compressive load of at least 600 psi.

Embodiment 96

The energy storage device of any preceding Embodiment wherein each of the first and second longitudinal end surfaces are under a compressive load of at least 700 psi.

Embodiment 97

The energy storage device of any preceding Embodiment wherein each of the first and second longitudinal end surfaces are under a compressive load of at least 800 psi.

Embodiment 98

The energy storage device of any preceding Embodiment wherein each of the first and second longitudinal end surfaces are under a compressive load of at least 900 psi.

Embodiment 99

The energy storage device of any preceding Embodiment wherein each of the first and second longitudinal end surfaces are under a compressive load of at least 1000 psi.

Embodiment 100

The energy storage device of any preceding Embodiment wherein the energy storage device has a rated capacity and the first and second longitudinal end surfaces are under such compressive load when the energy storage device is charged to at least 80% of its rated capacity.

Embodiment 101

The energy storage device of any preceding Embodiment wherein the electrode structures comprise an anodically active electroactive material and the counter-electrode structures comprise a cathodically active electroactive material.

Embodiment 102

The energy storage device of any preceding Embodiment wherein the electrode structures comprise an anodically active electroactive material comprising silicon and the counter-electrode structures comprise a cathodically active electroactive material.

Embodiment 103

The energy storage device of any preceding Embodiment wherein the energy storage device comprises a set of electrode assemblies, the set comprising at least two electrode assemblies.

Embodiment 104

The energy storage device of any of Embodiments 60-103 wherein the energy storage device comprises a set of at least two electrode assemblies and the constraint maintains a pressure on the electrode assemblies within the set as the energy storage device is cycled between the charged and the discharged states.

Embodiment 105

The energy storage device of any of Embodiment 1-60-103 wherein the energy storage device comprises a set of at least two electrode assemblies and the energy storage device comprises a corresponding number of constraints wherein each of the constraints maintains a pressure on one of the electrode assemblies within the set as the energy storage device is cycled between the charged and the discharged states.

Embodiment 106

The energy storage device of any preceding Embodiment wherein the electrode assembly comprises at least 5 electrode structures and at least 5 counter-electrode structures.

Embodiment 107

The energy storage device of any preceding Embodiment wherein the electrode assembly comprises at least 10 electrode structures and at least 10 counter-electrode structures.

Embodiment 108

The energy storage device of any preceding Embodiment wherein the electrode assembly comprises at least 50 electrode structures and at least 50 counter-electrode structures.

Embodiment 109

The energy storage device of any preceding Embodiment wherein the electrode assembly comprises at least 100 electrode structures and at least 100 counter-electrode structures.

Embodiment 110

The energy storage device of any preceding Embodiment wherein the electrode assembly comprises at least 500 electrode structures and at least 500 counter-electrode structures.

Embodiment 111

The energy storage device of any preceding Embodiment wherein the constraint comprises a material having an ultimate tensile strength of at least 10,000 psi (>70 MPa).

Embodiment 112

The energy storage device of any preceding Embodiment wherein the constraint comprises a material that is compatible with the electrolyte.

Embodiment 113

The energy storage device of any preceding Embodiment wherein the constraint comprises a material that does not significantly corrode at the floating or anode potential for the energy storage device.

Embodiment 114

The energy storage device of any preceding Embodiment wherein the constraint comprises a material that does not significantly react or lose mechanical strength at 45° C.

Embodiment 115

The energy storage device of any preceding Embodiment wherein the constraint comprises metal, metal alloy, ceramic, glass, plastic, or a combination thereof.

Embodiment 116

The energy storage device of any preceding Embodiment wherein the constraint comprises a sheet of material having a thickness in the range of about 10 to about 100 micrometers.

Embodiment 117

The energy storage device of any preceding Embodiment wherein the constraint comprises a sheet of material having a thickness in the range of about 30 to about 75 micrometers.

Embodiment 118

The energy storage device of any preceding Embodiment wherein the constraint comprises carbon fibers at >50% packing density.

Embodiment 119

The energy storage device of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 3.

Embodiment 120

The energy storage device of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 3.

Embodiment 121

The energy storage device of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 4.

Embodiment 122

The energy storage device of any preceding Embodiment wherein the compression members exert a pressure on the first and second longitudinal end surfaces that exceeds the pressure maintained on the electrode assembly in each of two directions that are mutually perpendicular and perpendicular to the stacking direction by factor of at least 5.

As various changes could be made in the above articles, compositions and methods without departing from the scope of the disclosure, it is intended that all matter contained in the above description and shown in the accompanying drawings shall be interpreted as illustrative and not in a limiting sense.

All directional descriptors, such as top, bottom, left, right, etc., are used solely for ease of reference with respect to the drawings and are not meant as limitations.

What is claimed is:

1. A sealed secondary battery for cycling between a charged state and a discharged state, the sealed secondary battery comprising an enclosure that seals the contents of the secondary battery, an electrode assembly and a non-aqueous liquid electrolyte within the enclosure, and a constraint within the enclosure that maintains a pressure on the electrode assembly as the energy storage device is cycled between the charged and the discharged states, the electrode assembly comprising a population of electrode structures, a population of counter-electrode structures and an electrically insulating microporous separator material between members of the electrode and counter-electrode populations wherein the electrode assembly has opposing first and second longitudinal end surfaces separated along a longitudinal axis, and a lateral surface surrounding the longitudinal axis and connecting the first and second longitudinal end surfaces, a combined surface area of the first and second longitudinal end surfaces being less than 33% of a combined surface area of the lateral surface and the first and second longitudinal end surfaces, members of the electrode population and members of the counter-electrode population are arranged in an alternating sequence in a stacking direction that parallels the longitudinal axis within the electrode assembly, the constraint comprises first and second compression members connected by at least one tension member that pulls the compression members toward each other, and the constraint maintains a pressure on the electrode assembly in the stacking direction that exceeds the pressure maintained on the electrode assembly in each of two directions that are mutually perpendicular and perpendicular to the stacking direction.

2. The secondary battery of claim 1, wherein the constraint comprises first and second compression members that overly the longitudinal end surfaces of the electrode assembly.

3. The secondary battery of claim 1, wherein the constraint comprises at least one compression member that is internal to the longitudinal end surfaces.

4. The secondary battery of claim 1, wherein a projection of the members of the electrode population and the counter-electrode populations onto the first longitudinal surface circumscribes a first projected area and a projection of the members of the electrode population and the counter-electrode populations onto the second longitudinal surface circumscribes a second projected area, and wherein the first and second projected areas each comprise at least 50% of the surface area of the first and second longitudinal end surfaces, respectively.

5. The secondary battery of claim 1, wherein a projection of the members of the electrode population and the counter-electrode populations onto the first longitudinal surface circumscribes a first projected area and a projection of the members of the electrode population and the counter-electrode populations onto the second longitudinal surface circumscribes a second projected area, and wherein the constraint imposes an average compressive force to each of the first and second projected areas of at least 0.7 kPa, averaged over the surface area of the first and second projected areas, respectively.

6. The secondary battery of claim 5, wherein the constraint imposes an average compressive force to each of the first and second projected areas of at least 2.8 kPa, averaged over the surface area of the first and second projected areas, respectively.

7. The secondary battery of claim 5 wherein the constraint imposes an average compressive force to each of the first and second projected areas of at least 5.25 kPa, averaged over the surface area of the first and second projected areas, respectively.

8. The secondary battery of claim 5 wherein constraint imposes an average compressive force to each of the first and second projected areas of at least 8.75 kPa, averaged over the surface area of the first and second projected areas, respectively.

9. The secondary battery of claim 1 wherein the combined surface area of the first and second longitudinal end surfaces is less than 25% of the surface area of the electrode assembly.

10. The secondary battery of claim 1 wherein the combined surface area of the first and second longitudinal end surfaces is less than 15% of the surface area of the electrode assembly.

11. The secondary battery of claim 1 wherein the constraint and enclosure have a combined volume that is less than 60% of the volume enclosed by the enclosure.

12. The secondary battery of claim 1 wherein the constraint and enclosure have a combined volume that is less than 30% of the volume enclosed by the enclosure.

13. The secondary battery of claim 1 wherein each member of the electrode population has a bottom, a top, a length $L_E$, a width $W_E$, a height $H_E$, and a central longitudinal axis $A_E$ extending from the bottom to the top of each such member and in a direction that is generally transverse to the stacking direction, the length $L_E$ of each member of the electrode population being measured in the direction of its central longitudinal axis $A_E$, the width $W_E$ of each member of the electrode population being measured in the stacking direction, and the height $H_E$ of each member of the electrode population being measured in a direction that is perpendicular to the central longitudinal axis $A_E$ of each such member and to the stacking direction, the ratio of $L_E$ to each of $W_E$ and $H_E$ of each member of the electrode population being at least 5:1, respectively, the ratio of $H_E$ to $W_E$ for each member of the electrode population being between 0.4:1 and 1000:1, respectively.

14. The secondary battery of claim 1 wherein the microporous separator material comprises a particulate material and a binder, has a void fraction of at least 20 vol. %, and is permeated by the non-aqueous liquid electrolyte.

15. The secondary battery of claim 1 wherein the distance between the at least one tension member and the lateral surface is less than 50% of the smallest Feret diameter of the electrode assembly, with the Feret diameter being measured in the same direction as the distance between the at least one tension member and the lateral surface of the electrode assembly.

16. The secondary battery of claim 1 wherein the distance between the at least one tension member and the lateral surface is less than 30% of the smallest Feret diameter of the electrode assembly, with the Feret diameter being measured in the same direction as the distance between the at least one tension member and the lateral surface of the electrode assembly.

17. The secondary battery of claim 1 wherein the distance between the at least one tension member and the lateral surface is less than 10% of the smallest Feret diameter of the electrode assembly, with the Feret diameter being measured in the same direction as the distance between the at least one tension member and the lateral surface of the electrode assembly.

18. The secondary battery of claim 1 wherein the secondary battery has a rated capacity, and the first and second longitudinal end surfaces are under a compressive load of at least 100 psi when the secondary battery is charged to at least 80% of its rated capacity.

19. The secondary battery of claim 1 wherein the secondary battery has a rated capacity, and the first and second longitudinal end surfaces are under a compressive load of at least 300 psi when the secondary battery is charged to at least 80% of its rated capacity.

20. The secondary battery of claim 1 wherein the secondary battery has a rated capacity, and the first and second longitudinal end surfaces are under a compressive load of at least 500 psi when the secondary battery is charged to at least 80% of its rated capacity.

21. The secondary battery of claim 1 wherein the secondary battery has a rated capacity, and the first and second longitudinal end surfaces are under a compressive load of at least 700 psi when the secondary battery is charged to at least 80% of its rated capacity.

22. The secondary battery of claim 1 wherein the secondary battery has a rated capacity, and the first and second longitudinal end surfaces are under a compressive load of at least 900 psi when the secondary battery is charged to at least 80% of its rated capacity.

23. The secondary battery of claim 1 wherein the electrode structures comprise an anodically active electroactive material and the counter-electrode structures comprise a cathodically active electroactive material.

24. The secondary battery of claim 1 wherein the electrode structures comprise an anodically active electroactive material comprising silicon and the counter-electrode structures comprise a cathodically active electroactive material.

25. The secondary battery of claim 1, wherein the secondary battery comprises a set of at least two electrode assemblies and the constraint maintains a pressure on the electrode assemblies within the set as the secondary battery is cycled between the charged and the discharged states.

26. The secondary battery of claim 1 wherein the electrode assembly comprises at least 5 electrode structures and at least 5 counter-electrode structures.

27. The secondary battery of claim 1 wherein the electrode assembly comprises at least 50 electrode structures and at least 50 counter-electrode structures.

28. The secondary battery of claim 1 wherein the electrode assembly comprises at least 500 electrode structures and at least 500 counter-electrode structures.

29. The secondary battery of claim 1 wherein the constraint comprises a material having an ultimate tensile strength of at least 10,000 psi (>70 MPa).

30. The secondary battery of claim 1 wherein the constraint comprises a material that is compatible with the non-aqueous liquid electrolyte.

31. The secondary battery of claim 1 wherein the constraint comprises a material that does not significantly corrode at the floating or anode potential for the energy storage device.

32. The secondary battery of claim 1 wherein the constraint comprises a material that does not significantly react or lose mechanical strength at 45° C.

33. The secondary battery of claim 1 wherein the constraint comprises metal, metal alloy, ceramic, glass, plastic, or a combination thereof.

34. The secondary battery of claim 1 wherein the constraint comprises a sheet of material having a thickness in the range of about 10 to about 100 micrometers.

35. The secondary battery of claim 1 wherein the constraint comprises a sheet of material having a thickness in the range of about 30 to about 75 micrometers.

36. The secondary battery of claim 1 wherein the constraint comprises carbon fibers at >50% packing density.

37. The secondary battery of claim 1 wherein the compression members exert a pressure on the first and second longitudinal end surfaces that exceeds the pressure maintained on the electrode assembly in each of two directions that are mutually perpendicular and perpendicular to the stacking direction by factor of at least 3.

38. The secondary battery of claim 1 wherein the compression members exert a pressure on the first and second longitudinal end surfaces that exceeds the pressure maintained on the electrode assembly in each of two directions that are mutually perpendicular and perpendicular to the stacking direction by factor of at least 4.

* * * * *